(12) United States Patent
O'Donnell et al.

(10) Patent No.: US 10,051,793 B2
(45) Date of Patent: Aug. 21, 2018

(54) STRAPPING SYSTEM FOR AGRICULTURAL IMPLEMENT

(71) Applicant: CNH Industrial America LLC, New Holland, PA (US)

(72) Inventors: Shaun A. O'Donnell, Lititz, PA (US); Dominick Brian Rizzon, Leola, PA (US); Josh Lounder, Honeybrook, PA (US)

(73) Assignee: CNH Industrial America LLC, New Holland, PA (US)

( * ) Notice: Subject to any disclaimer, the term of this patent is extended or adjusted under 35 U.S.C. 154(b) by 367 days.

(21) Appl. No.: 14/777,281

(22) PCT Filed: Mar. 13, 2014

(86) PCT No.: PCT/US2014/026454
§ 371 (c)(1),
(2) Date: Sep. 15, 2015

(87) PCT Pub. No.: WO2014/151790
PCT Pub. Date: Sep. 25, 2014

(65) Prior Publication Data
US 2016/0021828 A1 Jan. 28, 2016

Related U.S. Application Data

(60) Provisional application No. 61/799,388, filed on Mar. 15, 2013.

(51) Int. Cl.
*A01F 15/14* (2006.01)
*A01F 15/04* (2006.01)
(Continued)

(52) U.S. Cl.
CPC ............ *A01F 15/14* (2013.01); *A01F 15/042* (2013.01); *A01F 15/0858* (2013.01); *A01F 15/12* (2013.01); *B65B 27/12* (2013.01)

(58) Field of Classification Search
CPC ......... B65B 13/02; B65B 13/18; B65B 13/28; B65B 27/12; B30B 9/3003; A01F 15/042;
(Continued)

(56) References Cited

U.S. PATENT DOCUMENTS 3,667,377 A * 6/1972 Persson ................. A01F 15/146
100/11
4,155,296 A * 5/1979 Schafer ................... B65B 27/12
100/11
(Continued)

FOREIGN PATENT DOCUMENTS

DE 4122958 A1 1/1993
GB 1384045 A 2/1975
WO 9313988 A1 7/1993

*Primary Examiner* — Jimmy T Nguyen
(74) *Attorney, Agent, or Firm* — Patrick M. Sheldrake

(57) ABSTRACT

A strapping system for an agricultural implement includes a strap feeding assembly positioned on a first side of a baling chamber and a needle positioned on a second side of the baling chamber, opposite the first side. The system also includes a first slot disposed within a first material-facing surface of a rear wall of the baling chamber. The strap feeding assembly is configured to propel a strap through at least a portion of the first slot to the second side of the baling chamber, and the needle is configured to grip a portion of the strap and to move the portion of the strap from the second side of the baling chamber to the first side of the baling chamber to surround a material within the baling chamber with the strap.

17 Claims, 14 Drawing Sheets

(51) Int. Cl.
*A01F 15/08* (2006.01)
*B65B 27/12* (2006.01)
*A01F 15/12* (2006.01)

(58) Field of Classification Search
CPC ........ A01F 15/12; A01F 15/14; A01F 15/146; A01F 15/0858; A01F 15/04; A01F 15/145; A01F 2015/143
USPC ..... 100/3, 17, 18, 19 R, 20–24, 33 R, 33 PB
See application file for complete search history.

(56) References Cited

U.S. PATENT DOCUMENTS

| | | | | |
|---|---|---|---|---|
| 4,167,902 A | * | 9/1979 | Bister | ................. B65B 27/12 100/11 |
| 4,459,904 A | * | 7/1984 | Probst | ................. A01F 15/146 100/11 |
| 4,829,756 A | * | 5/1989 | Schrag | ................. A01F 15/042 100/179 |
| 5,899,139 A | | 5/1999 | Dorman | |
| 7,690,402 B2 | * | 4/2010 | Legtenberg | ........... A01F 15/146 100/2 |
| 2003/0028289 A1 | | 2/2003 | Daniel et al. | |

* cited by examiner

STRAPPING SYSTEM FOR AGRICULTURAL IMPLEMENT

CROSS REFERENCE TO RELATED APPLICATION

This application is the U.S. National Stage filing of International Application Serial No. PCT/US2014/026454, filed on Mar. 13, 2014 which claims priority to U.S. Provisional Application Ser. No. 61/799,388, entitled "STRAPPING SYSTEM FOR AGRICULTURAL IMPLEMENT", filed Mar. 15, 2013, each of which is hereby incorporated by reference in its entirety.

BACKGROUND OF THE INVENTION

The present invention relates generally to the field of packaging compressible materials, and more particularly, to systems for strapping bales of crop materials.

Generally, rectangular or square balers are utilized to compress certain materials into rectangular bales to facilitate storage and handling of the material. Usually, the material is compressed within a baling chamber until the material forms a bale of a desired size. Such balers typically include a mechanism for wrapping and knotting twine around the material to maintain the compressed shape of the bale. Unfortunately, twine may be difficult to remove from the bale during subsequent processing operations. In addition, the tensile strength of twine may be too low to effectively bind compressed materials in certain applications.

SUMMARY OF THE INVENTION

In one embodiment, a strapping system for an agricultural implement is provided. The strapping system includes a strap feeding assembly positioned on a first side of a baling chamber and a needle positioned on a second side of the baling chamber, opposite the first side. The strapping system also includes a first slot disposed within a first material-facing surface of a rear wall of the baling chamber. The strap feeding assembly is configured to propel the strap through at least a portion of the first slot to the second side of the baling chamber, and the needle is configured to grip a portion of the strap and to move the portion of the strap from the second side of the baling chamber to the first side of the baling chamber to surround the material within the baling chamber with the strap.

In a second embodiment, a strapping system for an agricultural implement includes a strap feedings assembly configured to propel a strap around at least a portion of a baling chamber. The strapping system also includes a needle configured to receive a portion of the strap, to grip the portion of the strap, and to move the portion of the strap through a slot disposed on a material-facing surface of a plunger from a first side of the baling chamber to a second side of the baling chamber. A track assembly extends along the portion of the baling chamber, along the needle, or a combination thereof, and the track assembly is configured to retain the strap at least until the needle moves the portion of the strap to the second side of the baling chamber.

In a third embodiment, a method for strapping a material in an agricultural implement using a strapping system is provided. The method includes moving a rear door having a slot to a first position that facilitates bale formation within a baling chamber. The method also includes routing a strap through the slot and around at least a portion of the baling chamber and directing a portion of the strap into a gripping assembly of a needle. The method also includes gripping the portion of the strap with the gripping assembly and moving the portion of the strap through the baling chamber, via movement of the needle, to surround the material with the strap.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to systems for strapping a bale of material using a relatively high-strength strap. In particular, various components are provided within a baler to efficiently surround the bale with the strap and to seal the strap securely around the bale. The described embodiments may provide certain advantages over traditional baling systems that use twine to contain bales. For example, the high strength and/or the large surface area of the strap may enable the strap to hold the bale in the desired size and density more efficiently than twine, thereby facilitating easy storage and handling of the bale. Additionally, unlike twine, the strap may be easily removed from the bale during subsequent processing operations. Furthermore, certain components described herein (such as, for example, track assemblies, needles, and gripping assemblies) may enable efficient strapping of the bale, while substantially reducing or eliminating twisting of the strap as the strap is applied to and sealed around the bale.

Figure 1:
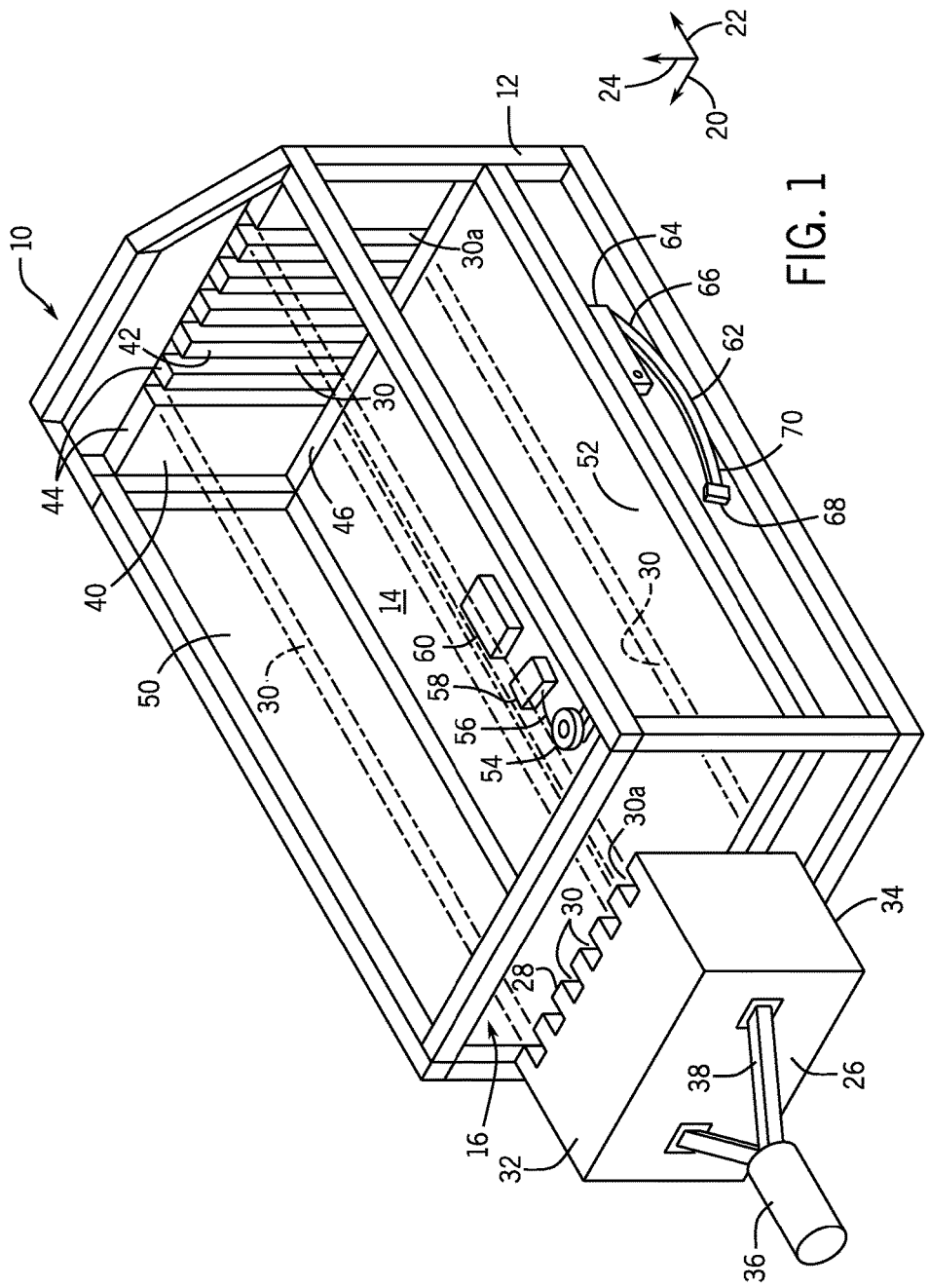
FIG. 1 is a perspective view of an embodiment of a portion of a baler configured to form and to strap rectangular bales of material.

FIG. 1 is a perspective view of an embodiment of a portion of a baler 10 configured to form and to strap rectangular bales of material (e.g., crop materials, such as hay, straw, grasses, silage, corn stalks, tobacco, cotton, biomass, etc.). In the illustrated embodiment, the baler 10 includes a frame 12 defining a baling chamber 14. The baling chamber 14 includes a first end 16 (e.g., forward end) and a second end 18 (e.g., rear end), which may generally relate to the direction of travel of the baler 10. For example, the baler 10 may be coupled to a tow vehicle and pulled through a field, collecting and baling the crop material as the baler 10 travels through the field. When connected to the tow vehicle, the forward end 16 is proximal to the vehicle, while the rear end 18 is distal from the vehicle. The baler 10 may also be included in a self-propelled chassis, or may be part of a self-contained vehicle. The baler 10 may be further defined has having a lateral axis 20, a longitudinal axis 22, and a vertical axis 24. Although the illustrated embodiment includes a horizontal rectangular baler 10, it should be understood that the systems disclosed herein may be readily adapted for use in other types of balers 10, such as vertical balers. Additionally, although the illustrated embodiment includes a baler 10 configured to bind the bale around the lateral axis 20, in other embodiments the baler 10 may be configured to bind the bale around the longitudinal axis 22 or the vertical axis 24.

In the baler 10 of FIG. 1, the material enters the baling chamber 14 through the forward end 16, and the material is compressed within the baling chamber 14 by a forward plunger 26. The forward plunger 26 then moves axially (e.g., along the longitudinal axis 22) within the baling chamber 14 to urge the compressible material rearwardly, thereby compressing the material against the rear wall 40. In the illustrated embodiment, the forward plunger 26 includes a material-facing surface 28 having multiple parallel slots 30 open to the baling chamber 14. As illustrated, the slots 30 extend from a first end 32 (e.g., top end) of the forward plunger 26 to a second end 34 (e.g., bottom end) of the forward plunger 26, and the slots 30 are generally aligned with the vertical axis 24 of the baler 10. The slots 30 are spaced evenly across the material-facing surface 28 of the forward plunger 26. As shown, six slots are provided on the material-facing surface 28 of the forward plunger 26, although two, three, four, five, seven, eight, nine, ten, or more slots may be provided in other embodiments. The forward plunger 26 is configured to move axially within the baling chamber 14 in a reciprocating motion along the longitudinal axis 22 of the baler 10. In other words, the forward plunger 26 is configured to move in a first direction (e.g., forward direction or forwardly) and in a second direction (e.g., rearward direction or rearwardly). In the illustrated embodiment, the forward plunger 26 is coupled to an actuator 36 via one or more arms 38. The actuator 36 may be a hydraulic cylinder or a pneumatic cylinder, or the actuator 36 may include a piston that drives a flywheel to power a gearbox. The gearbox may, in turn, rotate crank arms that are coupled to the arms 38, thereby facilitating motion of the forward plunger 26. Regardless of its form, the actuator 36 is configured to control the reciprocating motion of the forward plunger 26.

In the illustrated embodiment, the baler 10 includes a rear wall 40 (e.g., a rear door) disposed at or near the rear end 18 of the baler 10 and opposite the forward plunger 26. As shown, the rear wall 40 has a material-facing surface 42 having multiple parallel slots 30 open to the baling chamber 14. The slots 30 extend from a first end 44 (e.g., top end) of the rear wall 40 to a second end 46 (e.g., bottom end) of the rear wall 40, and the slots 30 are generally aligned with the vertical axis 24 of the baler 10. The slots 30 are spaced evenly across the material-facing surface 42 of the rear wall 40. Furthermore, each slot 30 of the rear wall 40 is disposed opposite (e.g., aligned with) one corresponding slot 30 of the forward plunger 26. In certain embodiments, the rear wall 40 is coupled to one or more actuators (e.g., hydraulic cylinder, pneumatic cylinder, etc.) via one or more arms, as described in more detail below. In the illustrated embodiment, the rear wall 40 is configured to open to enable the bale to move out of the baling chamber 14, as described in more detail below. For example, the rear wall 40 may rotate about a hinge 49, which may be positioned at the first end 44 or the second end 46 of the rear wall 40, to pivot outwardly away from the baling chamber 14.

As shown in FIG. 1, the baling chamber 14 also has a first wall 50 (e.g., a top wall) disposed on a first side 51 (e.g., a top side) of the baling chamber 14 and a second wall 52 (e.g., a bottom wall) disposed on a second side 53 (e.g., a bottom side) of the baling chamber 14, opposite the first wall 50. In the illustrated embodiment, the first wall 50 and the second wall 52 have multiple parallel slots 30 open to the baling chamber 14. The slots 30 disposed within the first wall 50 and the second wall 52 extend along the longitudinal axis 22 of the baler 10 between the forward plunger 26 and the rear wall 40. The slots 30 disposed within the first wall 50 and the second wall 52 may extend along the length of the baling chamber 14 so as to accommodate the various axial positions of the forward plunger 26, and to align with the slots 30 of the forward plunger 26 as the forward plunger 26 moves axially (e.g., along the longitudinal axis 22) within the baling chamber 14.

Additionally, the slots 30 formed in each of the forward plunger 26, the rear wall 40, the first wall 50, and the second wall 52 align so as to surround, or substantially surround, the baling chamber 14. More specifically, each of the forward plunger 26, the rear wall 40, the first wall 50, and the second wall 52 has a first slot 30a that aligns with corresponding slots 30 in the other components to substantially surround the baling chamber 14. As noted above, in some embodiments, two, three, four, five, six, or more slots 30 may be provided in each of the forward plunger 26, the rear wall 40, the first wall 50, and the second wall 52, and thus, the baling chamber 14 may be surrounded by two, three, four, five, six, or more slots 30. As discussed in more detail below, the slots 30 are aligned to enable a strap to be directed or routed around the baling chamber 14 to strap the compressible material within the baling chamber 14 into a bale.

In the illustrated embodiment, the baler 10 includes a spool 54 configured to store and to provide a strap 56 for strapping the material within the baling chamber 14. In certain embodiments, the spool 54 may be accessible and/or removable to facilitate replacement and/or installation of the strap 56. As illustrated, the spool 54 provides the strap 56 to a strap feeding assembly 58, which is configured to direct and/or to propel the strap 56 around at least a portion of the baling chamber 14. For example, the strap feeding assembly 58 propels the strap 56 through at least some of the slots 30 in order to surround at least a portion of the bale with the strap 56. As shown in FIG. 1, the baler 10 also includes a sealing assembly 60, which is configured to receive and/or to capture the strap 56, and to seal one portion of the strap 56 to another portion of the strap 56 to form the strap 56 into a sealed loop around the bale.

In systems having the sealing assembly 60, the slot 30 may be interrupted by the sealing assembly 60. In other words, the slot 30 may substantially surround the baling chamber 14, but the slot 30 may not be present at the location of the sealing assembly 60. For example, as shown in FIG. 1, the sealing assembly 60 is adjacent (e.g., proximal) to the first wall 50, and thus, the slot 30 is not present within the first wall 50 at the location of the sealing assembly 60. In some embodiments, the sealing assembly 60 may align with adjacent portions of the slot 30, enabling the strap 56 to be fed through the sealing assembly 60 and into the adjacent portion of the slot 30 to surround the bale. Additionally, such a configuration enables the strap 56 to be removed from both the sealing assembly 60 and the slots 30 after the strap 56 is sealed around the bale, as described in more detail below.

In certain embodiments, one or more of the spool 54, the strap feeding assembly 58, and the sealing assembly 60 are coupled to the frame 12 of the baler 10. The spool 54, the strap feeding assembly 58, and/or the sealing assembly 60 may be arranged in any suitable configuration. For example, the strap feeding assembly 58 may be forward (e.g., closer to the first end 16 of the baling chamber 14) of the sealing assembly 60, or the strap feeding assembly 60 may be rearward (e.g., closer to the second end 18 of the baling chamber 14). Furthermore, the spool 54, the strap feeding assembly 58, and/or the sealing assembly 60 may be disposed on the first side 51 of the baling chamber 14, in certain embodiments. Although one spool 54, one strap feeding assembly 58, and one sealing assembly 60 are shown in FIG. 1 for clarity, it should be understood that multiple sets of these components may be provided within the baler 10 in order to surround the bale with multiple straps 56, in some embodiments. For example, as shown in FIG. 1, the spool 54, the strap feeding assembly 58, and the sealing assembly 60 are aligned with the first slot 30a. However, a separate spool 54, strap feeding assembly 58, and sealing assembly 60 may be provided and aligned with each of the slots 30. Thus, multiple straps 56 may be directed or routed through the slots 30 and sealed around the bale, as described in more detail below.

Additionally, as noted above, although the illustrated embodiments show systems for strapping the bale about the lateral axis 20 of the baler 10, it should be understood that the systems disclosed herein may be readily adapted for strapping the bale about the longitudinal axis 22 or the vertical axis 24. For example, to strap the bale about the vertical axis 24, the slots 30 may extend across the material-facing surface 28 of the forward plunger 26 such that the slots 30 are aligned with the lateral axis 20 of the baler 10 and are parallel to the top end 32 and to the bottom end 34 of the forward plunger 26. Similarly, the slots 30 may extend across the material-facing surface 42 of the rear wall 40 such that the slots 30 are aligned with the lateral axis 20 of the baler 10 and are parallel to the top end 44 and to the bottom end 46 of the rear wall 40. In such configurations, the strap 42 may be propelled through the slots 30 laterally across the slots 30 of the forward plunger 26 and the slots 30 of the rear wall 40. Additionally, in such configurations, rather than slots 30 being formed in the top wall 50 and the bottom wall 52, the slots 30 may extend along a first side wall and a second side wall, opposite the first side wall, of the baling chamber 14 between the forward plunger 26 and the rear wall 40. The spool 54, the strap feeding assembly 58, and/or the sealing assembly 60 may be disposed on the first side wall of the baling chamber 14, and the needle 62 may be disposed on the second side wall of the baling chamber 14. The components may function together to surround the bale with the strap 42 about the vertical axis 24 of the baler 10 in a similar manner, although the components and system may be oriented and adapted for strapping the bale about the vertical axis 24.

The strap 56 may be formed from any suitable relatively high-strength material. For example, the strap 56 may have a strength of about 150 kilograms-force (kgf) to about 1500 kgf. In some embodiments, the strap 56 may have a strength of about 300 kgf to about 1200 kgf. The strap 56 may be any suitable width, although the strap 56 may be about 1 centimeter (cm) to about 5 cm wide, in some embodiments. In certain embodiments, the strap 56 may be formed from carbon steel or plastics, such as polypropylene or polyester. In some embodiments, the baler 10 is configured to form bales that are about 2 to about 3 meters long (along the longitudinal axis 22) by about 1 to about 2 meters wide (along the lateral axis 20) by about 0.5 to about 1 meters tall (along the vertical axis 22), and the strap 56 is of a suitable strength to securely strap bales of this size.

Additionally, the baler 10 depicted in FIG. 1 includes a needle 62, which may be generally disposed on the second side 53 of the baling chamber 14. The needle 62 is configured to move through the baling chamber 14, and in some embodiments, the needle 62 may move through the baling chamber 14 on an arc. In the illustrated embodiment, the needle 62 is configured to rotate about an attachment 64 coupled to a first end 66 of the needle 62. Additionally, in certain embodiments, the needle 62 may be coupled to a gripping assembly 68 disposed generally near (e.g., proximal to) a second end 70 of the needle 62. The gripping assembly 68 of the needle 62 may be configured to receive and to grip the strap 56. The needle 62 and the gripping assembly 68 may have any of a variety of configurations and may serve any of a variety of functions, as described in more detail below. For example, the needle 62 may be configured to transport the strap 56 from the second side 53 to the first side 51 of the baling chamber 14 to wrap the strap 56 around the bale and/or to transfer the strap 56 to the sealing assembly 60.

Figure 2:
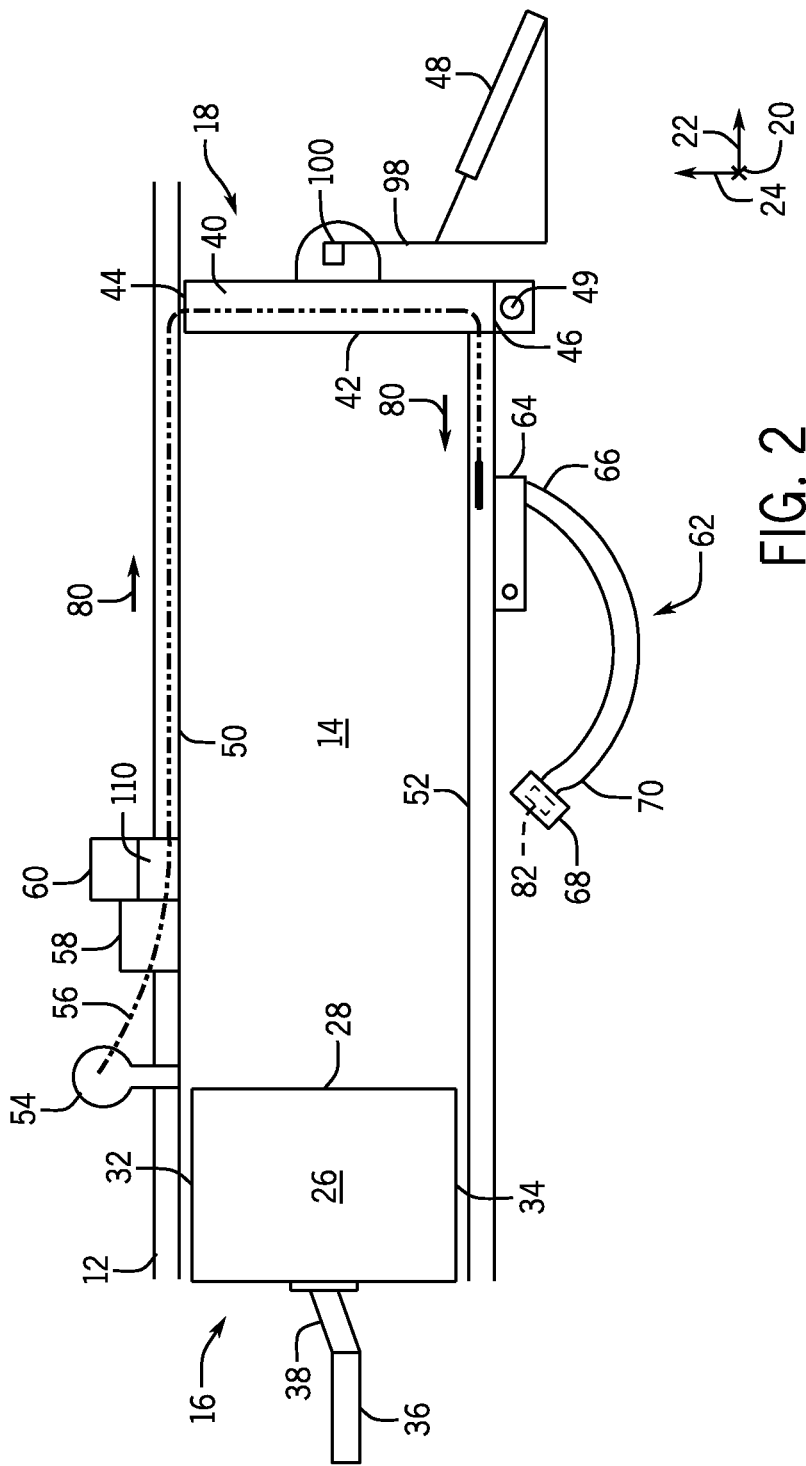
FIG. 2 is a side cross-sectional view of an embodiment of a baler having a strap extending around a portion of a baling chamber prior to strapping a bale.

FIG. 2 is a side cross-sectional view of an embodiment of a baler 10 having a strap 56 extending around a portion of a baling chamber 14 prior to strapping a bale. As shown, the forward plunger 26 is disposed at the forward end 16 of the baling chamber 14, and the rear wall 40 is disposed at the rear end 18 of the baling chamber 14, opposite the forward plunger 26. The top wall 50 and the bottom wall 52 extend between the forward plunger 26 and the rear wall 40 along the longitudinal axis 22 of the baling chamber 14.

The top wall 50, the bottom wall 52, and/or the rear wall 40 include slots 30. In operation, the strap feeding assembly 58 propels the strap 56 around at least a portion of the baling chamber 14 (e.g., around at least the second end 18 of the baling chamber) through the slots 30 of the top wall 50, the bottom wall 52, and/or the rear wall 40 as shown by arrow 80. As shown, the strap feeding assembly 58 may propel the strap 56 around at least a portion of the baling chamber 14 toward the needle 62. In some embodiments, the strap feeding assembly 58 propels the strap 56 through the slots 30 around at least a portion of the baling chamber 14 as material flows into and accumulates within the baling chamber 14.

Figure 3:
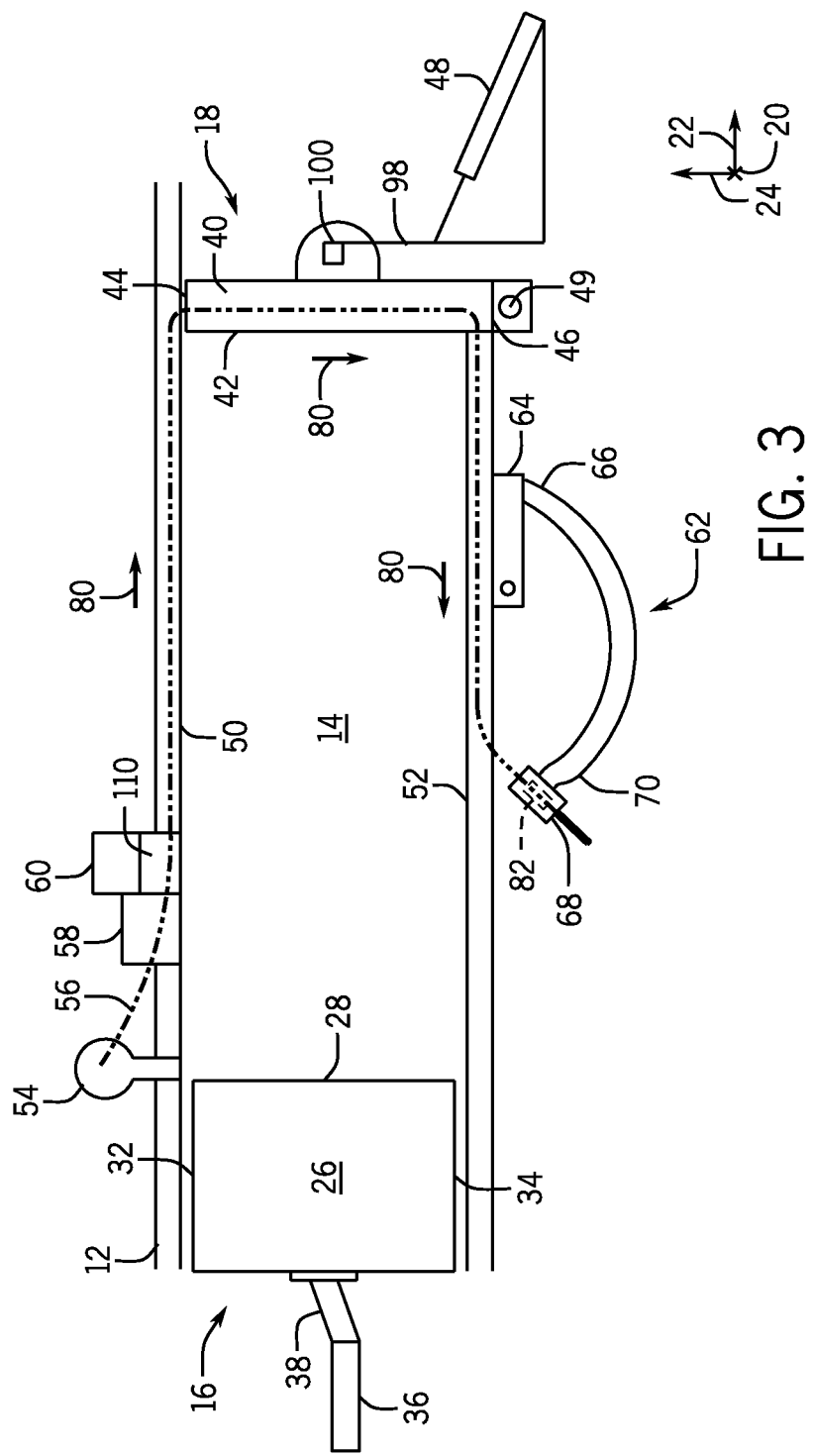
FIG. 3 is a side cross-sectional view of the baler of FIG. 2, in which a needle grips the strap.

FIG. 3 is a side cross-sectional view of the baler of FIG. 2, in which the gripping assembly 68 of the needle 62 grips the strap 56. As shown, the strap 56 is propelled from the strap feeding assembly 58 around at least a portion of the baling chamber 14 to the gripping assembly 68 of the needle 62. The gripping assembly 68 may be positioned within a portion of the slot 30 disposed on the bottom wall 52. Alternatively, the slot 30 of the bottom wall 52 may open or have an aperture (e.g., space, hole, opening, etc.) configured to enable the strap 56 to exit the slot 30 and move toward the gripping assembly 68 and/or to enable the needle 62 to move through the bottom wall 52 into the baling chamber 14, as described below.

After the strap 56 is propelled through the slots 30 of the top wall 50, the rear wall 40, and/or the bottom wall 52, the strap 56 is directed toward and engages the gripping assembly 68 of the needle 62. Upon the strap 56 engaging the gripping assembly 68 of the needle 62, the gripping assembly 68 captures (e.g., grip, clamp, hold, etc.) the strap 56. The gripping assembly 68 may include a sensor 82 configured to detect the strap 56 within the gripping assembly 68. In such a configuration, the gripping assembly 68 is configured to close when the strap 56 is detected within or on the gripping assembly 68. In certain embodiments, after the gripping assembly 68 captures the strap 56, the strap feeding assembly 58 may stop propelling the strap 56 through the slots 30. In some embodiments, the strap feeding assembly 58 feeds the strap 56 a preset length to enable the strap 56 to reach the gripping assembly 68 of the needle 62. In some embodiments, the strap feeding assembly 58 feeds the strap for a preset amount of time to enable the strap 56 to reach the gripping assembly 68 of the needle 62. In other embodiments, the strap feeding assembly 58 feeds the strap 56 until the sensor 82 (or other mechanism) detects the strap 56 within the gripping assembly 68 and/or the gripping assembly 68 grips the strap 56. A control system then stops the propulsion of the strap 56.

Figure 4:
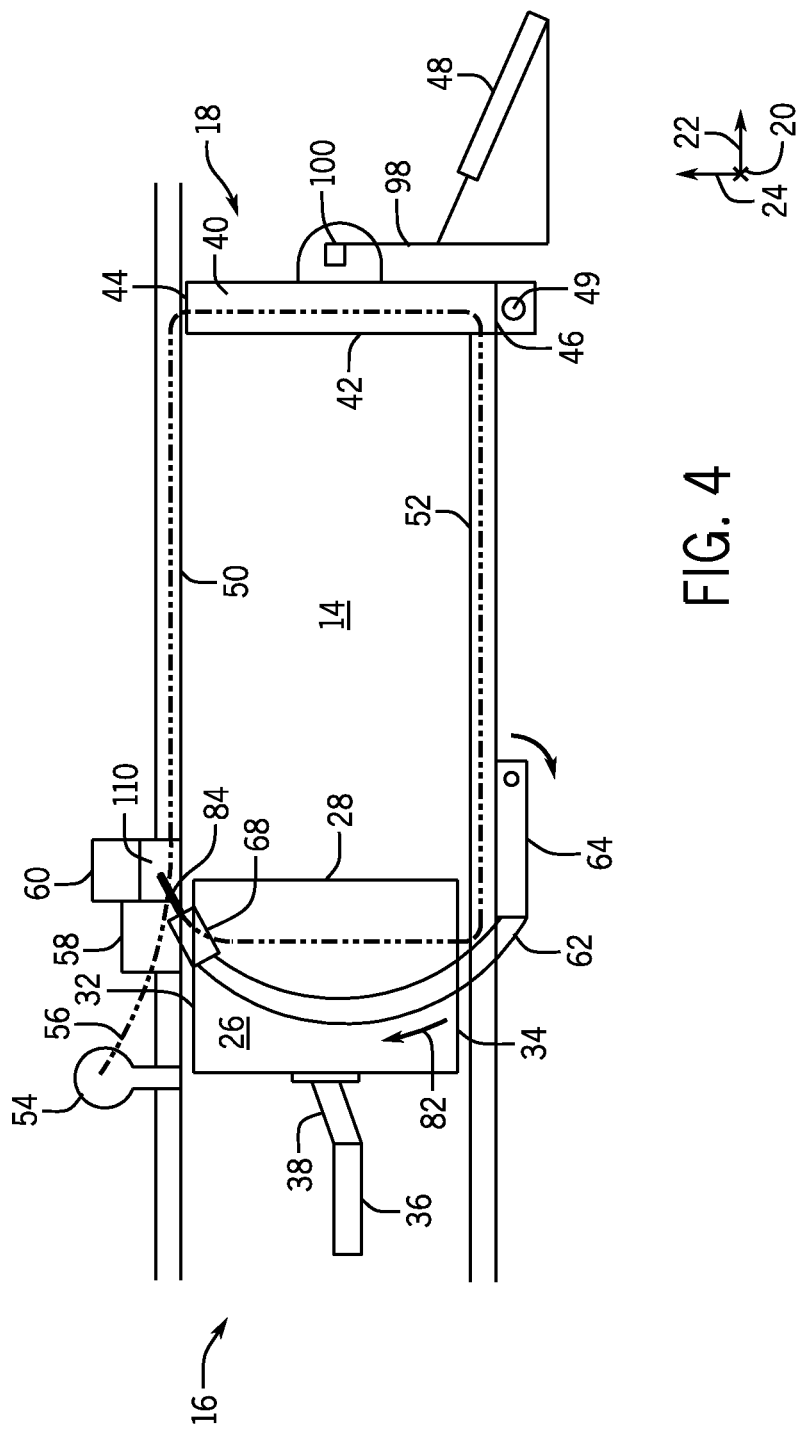
FIG. 4 is a side cross-sectional view of the baler of FIG. 2, in which the needle extends through the baling chamber to surround the bale with the strap.

FIG. 4 is a side cross-sectional view of the baler of FIG. 2, in which the needle 62 extends through (e.g., across) the baling chamber 14 to surround the bale with the strap 56. The needle 62 may move through the baling chamber 14 (e.g., the needle 62 may be tripped or activated) when a desired size and/or density of the bale is achieved. For example, the rear wall 40 may include a strain gauge 100 configured to detect a force applied by the material against the rear wall 40. Thus, when a certain or threshold force is detected, the control system may initiate movement of the needle 62 through the baling chamber 14 as shown in FIG. 4.

As shown, the gripping assembly 68 grips a portion of the strap 56, and the needle 62 moves through the baling chamber 14 from the second side 53 to the first side 51. In other words, the gripping assembly 68 of the needle 62 grips the strap 56, and the needle 62 moves (e.g., rotates and/or translates) through the baling chamber 14 as indicated by arrow 82. Thus, the needle 62 brings the strap 56 from the second side 53 to the first side 51 of the baling chamber 14. In some embodiments, the strap feeding assembly 58 may release tension (e.g., frictional tension) on the strap 56, enabling the needle 62 to freely pull the strap 56 (e.g., a length of strap, additional strap, etc.) from the strap feeding assembly 58 as the needle 62 moves the strap 56 through the baling chamber 14. In certain embodiments, the needle 62 may move between the second side 53 and the first side 51, or vice versa, through the slot 30 of the forward plunger 26. Such a configuration provides a passageway for the needle 62 to move through the baling chamber 14 without interference from the material, and enables the forward plunger 26 to maintain contact with (e.g., engage) the bale, thereby maintaining the shape of the bale while the needle 62 moves the strap 56 around the bale.

In the illustrated embodiment, the needle 62 directs or transfers an end 84 of the strap 56 into the sealing assembly 60. In some embodiments, the end 84 of the strap 56 may extend approximately 30 cm or less from the gripping assembly 58. When the end 84 of the strap 56 is transferred to the sealing assembly 60, the gripping assembly 68 of the needle 62 releases the strap 56. The sealing assembly 60 holds the received end 84 of the strap 56 and brings the end 84 into contact with a portion 86 of the strap 56 already disposed within the sealing assembly 60. In certain embodiments, the strap feeding assembly 58 may retract (e.g., pull back) on the strap 56 as indicated by arrow 88, thus pulling the strap 56 out of the slots 30 and/or tightening the strap 56 around the bale prior to the strap 56 being sealed. The sealing assembly 60 may seal the end 84 to the portion 86 of the strap 56, thus sealing the strap 56 into a loop around the bale within the baling chamber 14. The sealing assembly 60 may also cut the strap 56, thus releasing the strap 56 from the sealing assembly 60 so that the strapping process may be repeated for another bale. The needle 62 may move from the first side 51 to the second side 53 of the baling chamber 14 in preparation for strapping a subsequent bale.

Figure 5:
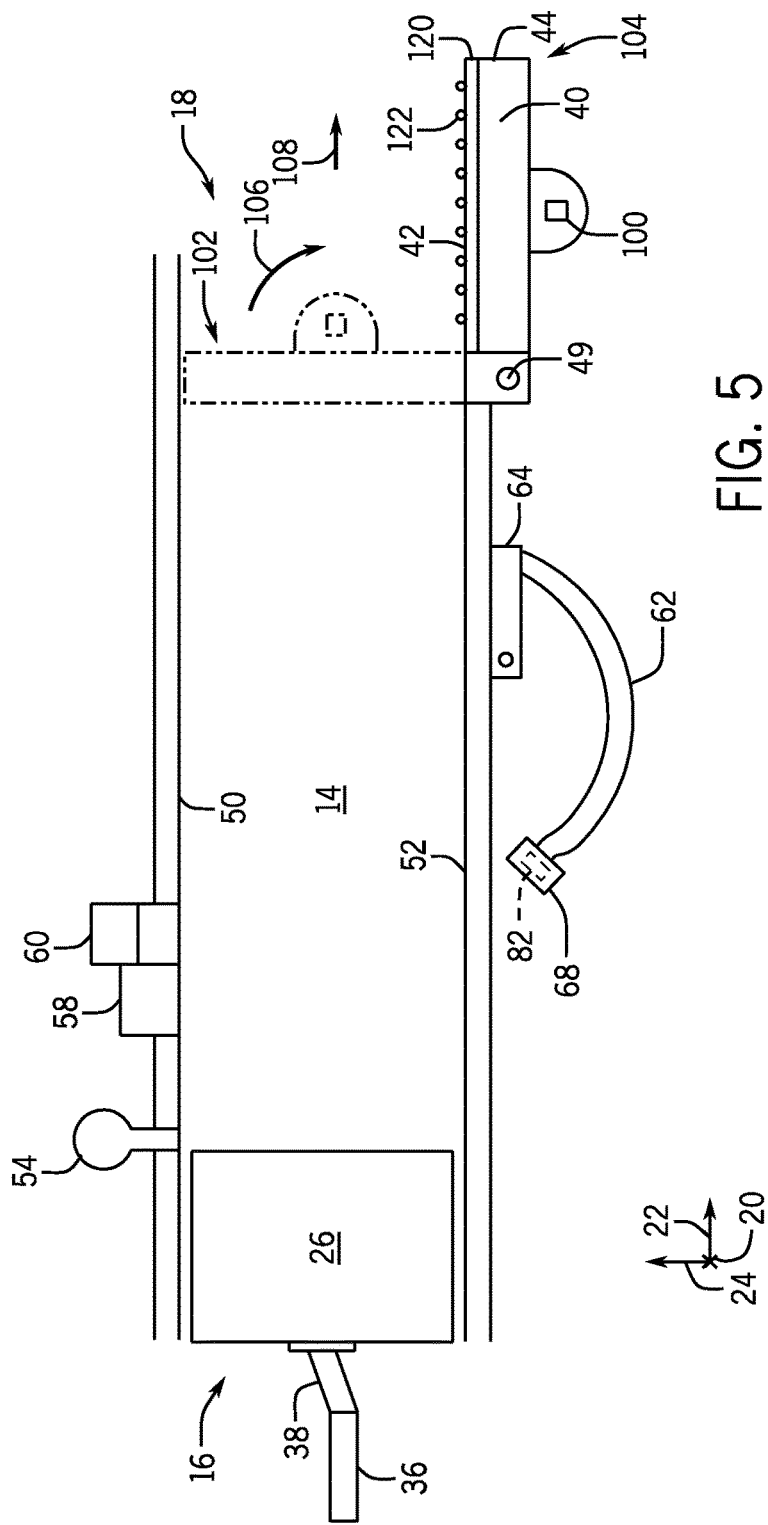
FIG. 5 is a side cross-sectional view of the baler of FIG. 2, in which the bale is removed from the baling chamber.

FIG. 5 is a side cross-sectional view of the baler of FIG. 2, in which the bale is removed from the baling chamber 14. As shown, the rear door 40 pivots about the hinge 49 from a first position 102 (e.g., a generally vertical position) to a second position (e.g., a generally horizontal position 104) as shown by arrow 106. In the first position 102, the rear door 40 may be configured to support the bale within the baling chamber 14, and in the second position 104, the rear door 40 may be configured to enable the bale to be removed from the baling chamber 14 in the direction 108. Thus, the rear wall 40 is configured to open (e.g., rotate about a hinge 49 positioned at the first end 44 or the second end 46 of the rear wall 40, pivot outwardly from the baling chamber 14, etc.) to enable the bale to move out of the baling chamber 14.

As described above with respect to FIG. 1, the rear wall 40 may be coupled to one or more actuators 48 (e.g., hydraulic cylinder, pneumatic cylinder, etc.) via one or more arms 98. Additionally, the rear wall 40 may be configured to move (e.g., rotate) when the force applied against the rear wall 40 by the material within the baling chamber 14 exceeds a certain or threshold force. In some embodiments, the rear wall 40 may be configured to move/rotate automatically when the strapping process is complete. For example, the rear wall 40 may be configured to move/rotate automatically when the strap 56 is sealed around the bale.

In certain embodiments, a conveyor 120 (e.g., belt, track, chain, etc.) is disposed on the material-facing surface 42 of the rear wall 40 to facilitate removal of the bale from the baling chamber 14. The conveyor 120 may have a textured surface 122 (e.g., protrusions, dogs, etc.) configured to engage the bale and to facilitate removal of the bale from the baling chamber 14. During or after movement of the rear wall 40 to the second position 104, the conveyor 120 may urge the bale toward the first end 44 of the rear wall 40, thereby pulling the bale out of the baling chamber 14 in the direction 108.

Figure 6:
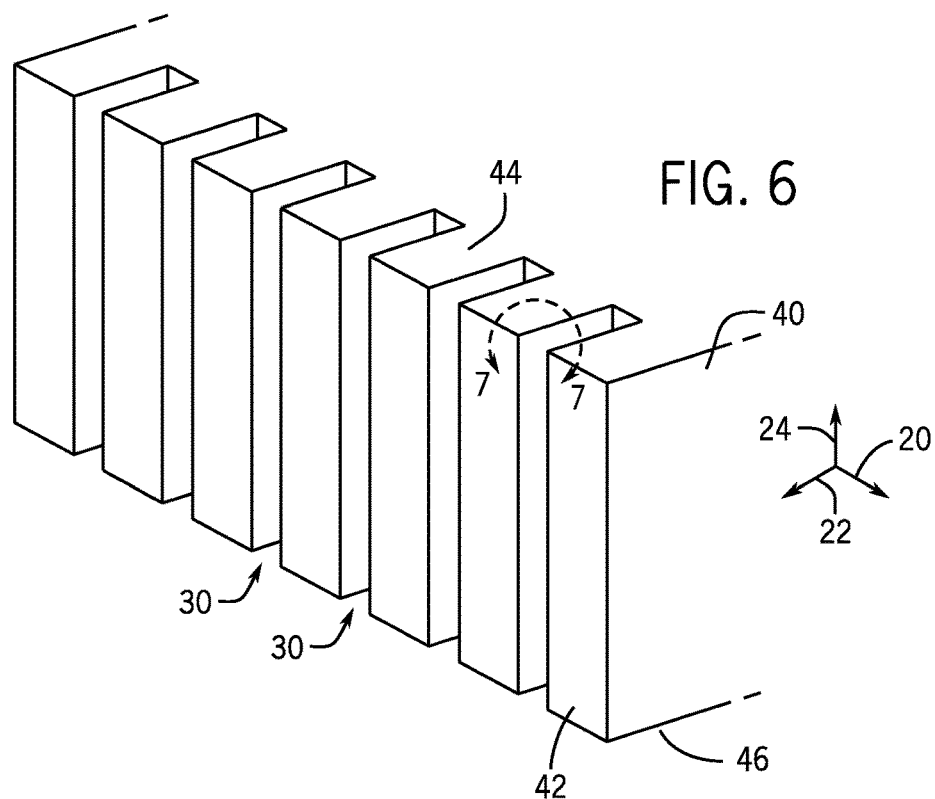
FIG. 6 is a perspective view of an embodiment of a plunger having multiple slots formed on a material-facing surface of the plunger.

FIG. 6 is a perspective view of an embodiment of the rear wall 40 having multiple slots 30 formed on the material-facing surface 42 of the rear wall 40. As discussed above, the parallel slots 30, which open to the baling chamber 14, extend from the first end 44 (e.g., top end) of the rear wall 40 to the second end 46 (e.g., bottom end) of the rear wall 40, and the slots 30 are generally aligned with the vertical axis 24 of the baler 10. The slots 30 are spaced evenly across the material-facing surface 42 of the rear wall 40, although other spacing may be suitable in some embodiments. As shown, six slots are provided on the material-facing surface 42 of the rear wall 40, although two, three, four, five, seven, eight, nine, ten, or more slots may be provided in other embodiments. The slots 30 disposed in the forward plunger 26 may have a similar configuration to the slots 30 disposed in the illustrated rear wall 40.

Figure 7:
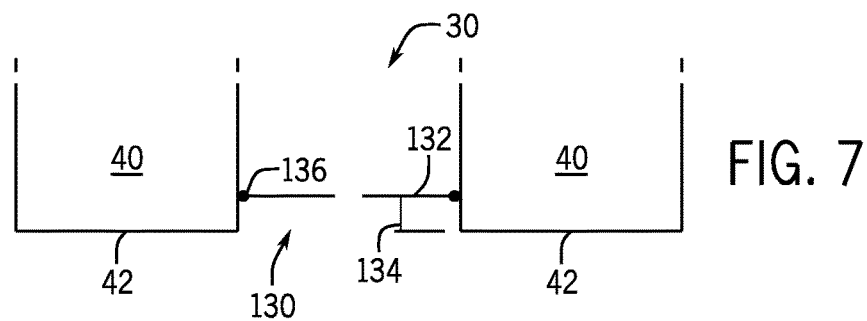
FIG. 7 is a cross-sectional view of an embodiment of a track assembly having a gate disposed within a slot of a plunger.

FIG. 7 is a cross-sectional view of an embodiment of a track assembly 130 having a gate 132 disposed within the slot 30 of the rear wall 40. Although the slot 30 having the gate 132 is shown within the rear wall 40 in FIG. 7, the track assembly 130 having similar gates 132 may be disposed within the slots 30 of the first wall 50, the second wall 52, and/or the forward plunger 26. In some embodiments, the gates 132 may be recessed a distance 134 within the slot 30 (e.g., from the material-facing surface 42 of the rear wall 40). Recessing the gate 132 from the material-facing surface 42, for example, may enable the gate 132 to open and close without interference from the material within the baling chamber 14. The gate 132 may generally retain the strap 56 within the slot 30 as the strap 56 travels through the slot 30, as described in more detail below. As shown, the gate 132 is coupled to the slot 30 by one or more hinges 136, which may be spring-loaded, although any suitable mechanism for coupling the gate 132 to the slot 30 is contemplated. In such configurations, after the strap 56 is fed through the slots 30 around the baling chamber 14, the gate 132 releases the strap 56 from the slots 30 when a force is applied to the gate 132 by the strap 56. For example, the gates 132 may release the strap 56 when the strap 56 is pulled tightly around the bale (e.g., by the strap feeding assembly 58 or the sealing assembly 60). In some embodiments, the gate 132 may be actuated, and the gate 132 may be configured to open at a certain time (e.g., after the strap 56 is fed through the slots 30 and surrounds the bale within the baling chamber 14).

Figure 8:
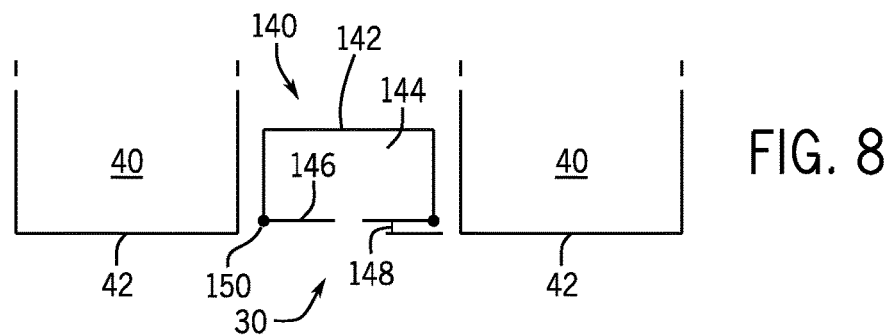
FIG. 8 is a cross-sectional view of another embodiment of a track assembly disposed within a slot of a plunger.

FIG. 8 is a cross-sectional view of another embodiment of a self-contained track assembly 140 disposed within the slot 30. In certain balers 10, it may be desirable to provide the track assembly 140 within each slot 30 to receive and to direct the strap 56 through the slot 30 and around at least a portion of the baling chamber 14. For example, the track assembly 140 may be formed from materials (e.g., high-strength materials) that may be configured to reduce wear from the movement of the straps 56 through the track assembly 140. The track assembly 140 may also be repaired or replaced should a portion of the track assembly 140 become worn over time, without the need to replace the rear wall 40 or the top and bottom walls 50, 52, for example. In the illustrated embodiment, the track assembly 140 is coupled to the slot 30, and thus, the slot 30 supports the track assembly 140. In certain embodiments, the track assembly 140 extends from the first end 44 to the second end 46 of the rear wall 40 and/or along the length of the slots 30 formed within the first wall 50 and second wall 52. However, in some embodiments, the track assembly 140 may only be provided in the slot 30 of the rear wall 40 and/or along at least a portion of the slots 30 formed within the first wall 50 and second wall 52 (e.g., the track assembly may generally surround the rear end 18 of the baling chamber 14). Again, although the slot 30 is shown within the rear wall 40 in FIG. 8, similar track assemblies 140 may be disposed within the slots 30 of the first wall 50, the second wall 52, and/or the forward plunger 26.

As shown in FIG. 8, the track assembly 140 also includes walls 142 defining a channel 144 through which the strap 56 may travel. The track assembly 140 also has a gate 146 (e.g., the track assembly 140 may include a gated channel 144). Similar to the gate 136 described above with respect to FIG. 7, the gate 146 is configured to retain the strap 56 within the channel 144 as the strap 56 is propelled through the channel 144. In some embodiments, the gates 146 may be recessed a distance 148 within the slot 30 (e.g., from the material-facing surface 28 of the forward plunger 26). Recessing the gate 146 from the material-facing surface 28, for example, may enable the gate 146 to open and close without interference from the material within the baling chamber 14. As shown, the gate 146 is coupled to the walls 142 by one or more hinges 150, which may be spring-loaded. In such cases, after the strap 56 is fed through the channel 144 around the baling chamber 14, the gate 146 releases the strap 56 from the channel 144 when a force is applied to the gate 150 by the strap 56. For example, the gates 146 may release the strap 56 when the strap 56 is pulled tightly around the bale (e.g., by the strap feeding assembly 58 or the sealing assembly 60). In some embodiments, the gate 146 may be actuated, and the gate 146 may be configured to open at a certain time (e.g., after the strap 56 is fed through the channel 144 and surrounds the bale within the baling chamber 14).

Thus, the strap 56 may be directed around the baling chamber 14 and/or from the second side 53 to the first side 51 (or vice versa) of the baling chamber 14 via the slot 30. Furthermore, in certain embodiments, the slot 30 may include the track assembly 130, 150 to guide and maintain the strap 56 within the slot 30. In addition, the track assembly 130, 140 may be segmented. For example, when the track assembly 130, 140 is disposed in the slot 30 of the forward plunger 26, the track assembly 130, 140 may be segmented along the vertical axis 24 of the baling chamber 14 (e.g., the track assembly 130, 140 may not be continuous between the first end 32 and the second end 34 of the forward plunger 26). Such segmentation may use less material than a continuous track assembly, thereby lowering costs, lowering weight, and providing easier replacement. The segmentation may also facilitate efficient strapping of the bale. For example, if the track assembly 130, 140 is vertically segmented, each segment may capture and direct the end 84 of the strap 56 as the needle 62 transports the strap 56 from the second side 53 to the first side 51 of the baling chamber 14. For example, the end 84 of the strap 56 may be held by the gripping assembly 58 at the second end 70 of the needle 62. Therefore, the end 84 of the strap 56 may enter the track assembly 130, 140 as the needle 62 moves through the slot 30. The gates 132, 146 may then be closed, thereby maintaining the end 84 of the strap 56 within the slot 30. However, as the needle 62 moves through the slot 30, the gates 132, 146 may open due to contact with the needle 62, thereby enabling the strap 42 to be tightened against the bale. However, due to the segmentation of the track assembly 130, 140 and/or the configuration of the needle 62, the gates 132, 146 remain closed until the end 84 of the strap 56 has entered the next segment of the track assembly 130, 140. Therefore, the segmented track assembly 130, 140 facilitates transferring the end 84 of the strap 56 through slot 30, while also enabling the strap 56 to move inwardly toward and to wrap around the bale as the gates 132, 146 open in response to the needle 62 moving through the slot 30.

Figure 9:
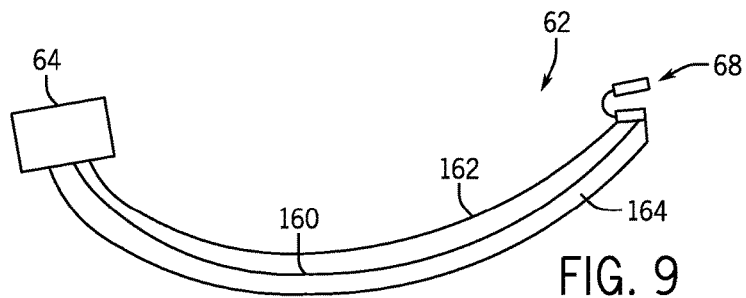
FIG. 9 is a side cross-sectional view of an embodiment of a hollow needle.

FIG. 9 is a side cross-sectional view of an embodiment of the needle 62, in which the needle 62 is hollow. The hollow needle 62 is configured to facilitate actuation of the gripping assembly 68 disposed near the second end 70 of the needle 62. In the illustrated embodiment, the gripping assembly 68 may be actuated by any suitable mechanism, such as by a cable 160 disposed within the needle 62. Thus, as shown, the needle 62 includes an outer wall 162 defining an inner cavity 164 extending along the length of the needle 62, and the cable 160 is disposed within the inner cavity 164. The cable 160 may actuate the gripping assembly 68 electronically or mechanically (e.g., hydraulically, pneumatically, or by movement of the cable). For example, the cable 160 may be a pneumatic conduit that provides air to a pneumatic actuator disposed in the gripping assembly 68. In other embodiments, the cable 160 extends from a pneumatic actuator to the gripping assembly 68. In such embodiments, movement of the pneumatic actuator drives the cable to actuate the gripping assembly 68. In some embodiments, a solenoid or a linear actuator may drive the cable 160 to actuate the gripping assembly 68. The solenoid or linear actuator may be disposed proximate to the attachment 64. In embodiments having the linear actuator, a two position air valve may be utilized to drive the cable 160. Thus, the cable 160 may drive the gripping assembly 68 to grip the strap 56. Similarly, when the strap 56 is fed into the sealing assembly 60, the cable 160 may drive the gripping assembly 68 to release the strap 56. The hollow needle 62 may have any suitable shape. For example, the needle 62 may have a generally cylindrical or annular horizontal cross-section and may have a curvature along its length.

Figure 10:
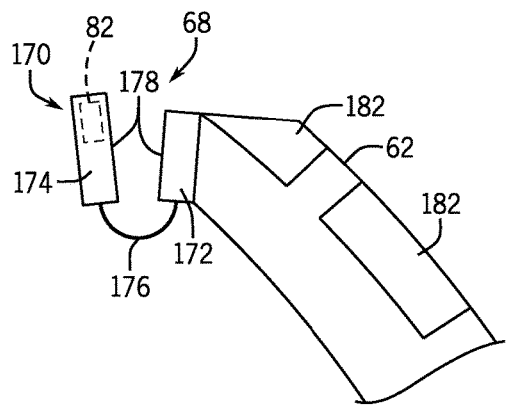
FIG. 10 is a side cross-sectional view of an end of the hollow needle of FIG. 9 having a gripping assembly, taken within line 10-10.

FIG. 10 is a side cross-sectional view of the second end 70 of the needle 62, taken within line 10-10 of FIG. 9. In some embodiments, the needle 62 may be tapered along its length or have a tapered portion at or near the second end 70. The gripping assembly 68 may include any suitable gripping device, which may be coupled to the needle 62 in any suitable manner. For example, as shown in FIG. 10, the gripping assembly 62 is disposed near (e.g., proximal) the second end 70 of the needle 62. As shown, the gripping assembly 68 includes a "duck-bill" gripper 170 having a bottom portion 172 and a top portion 174 coupled to one another by a connector 176 (e.g., hinge). In some embodiments, the bottom portion 172 may be directly attached (e.g., integrated, secured to, etc.) to the needle 62, and may be stationary (e.g., may not move relative to the needle 62) as the top portion 174 moves (e.g., opens or closes) about the hinge 176. As discussed above, when the strap 56 contacts the gripping assembly 68, the hinge 176 enables the top portion 164 to grip the strap 56 between gripping surfaces 178. In some embodiments, one or both of the gripping surfaces 178 may be textured (e.g., grooved, knurled, toothed, etc.) to facilitate gripping the strap 56. Additionally, as described above, the gripping assembly 68 may include a sensor 179 configured to sense contact with the strap 56 or placement of the strap 56 within the gripping assembly 68, and the gripping assembly 68 may be configured to automatically close upon detection of the strap 56. Although shown in the top portion 174, it should be understood that the sensor 179 may be disposed on the gripping assembly 68 in any suitable position or may be coupled to the gripping assembly 68 in any suitable manner. Although the gripping assembly 68 of the needle is shown to include the duck-bill gripper 170, any suitable gripper configuration may be utilized within the gripping assembly 68.

Figure 11:
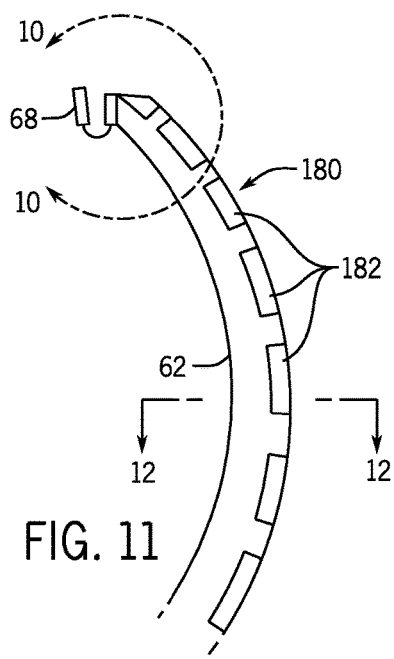
FIG. 11 is a side cross-sectional view of an embodiment of a needle having a track assembly.

In certain embodiments, as described further below, the strap 56 may be propelled along a track assembly 180 disposed within or coupled to the needle 68. For example, rather than being propelled along the slot 30 of the bottom wall 52 from the second end 18 toward the first end 16 of the baling chamber 13, the strap 56 may be propelled through the track assembly 180 of the needle 68 to move the strap 56 around at least a portion of the baling chamber 14. Accordingly, FIG. 11 is a side cross-sectional view of one embodiment of the needle 62 having a track assembly 180 and the gripping assembly 68. As noted below, in some embodiments, the strap 56 may be directed or routed through the track assembly 180 disposed within or coupled to the needle 62. As shown in FIG. 11, the track assembly 180 extends along a length of the needle 62. Additionally, the track assembly 180 may be segmented (e.g., a segmented track assembly) along the length of the needle 62 (e.g., the track assembly 180 may be discontinuous and may include multiple segments 182 disposed along the length of the needle 62). Each segment 182 of the track assembly 180 may have a gate similar to the gate 13 described above with respect to FIG. 7 to retain the strap within the segments 182. Alternatively, a continuous track assembly 180 having a curvature that substantially corresponds to the curvature of the needle 62 may be provided within the needle 62.

Figure 12:
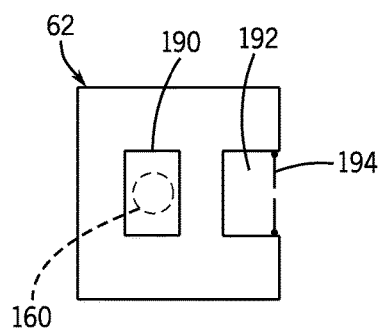
FIG. 12 is a top cross-sectional view of the needle of FIG. 11, taken along line 12-12.

FIG. 12 is a top cross-sectional view of an embodiment of the needle 62 of FIG. 11, taken along line 12-12. As shown, the needle 62 has multiple paths extending through the cross-section. Such a configuration may enable the needle 62 to have and/or to support both the track assembly 180 and the actuation mechanism, such as the cable 160, for actuating the gripping assembly 68. As illustrated, the needle 62 includes a cavity 190 extending along the length of the needle 62 between the attachment 64 and the gripping assembly 68. The cavity 190 is configured to support the cable 160. The cavity 190 may fully or partially surround the circumference of the cable 160. Further, as shown, the needle 62 includes an opening (e.g., a slot) 192 extending along the length of the needle 62, or at least along a portion of the length of the needle 62 to support the track assembly 180, which is similar to the track assembly 130. As described above with reference to FIG. 7, the opening 192 of the needle 62 may directly support one or more gates 194. Alternatively, the opening 192 may support a self-contained track assembly 180, similar to the track assembly 140 of FIG. 8. The track assembly 180 and the gates 194 may have similar features to the track assemblies 130, 140, and their respective gates, disposed within the slots 30.

Figure 13:
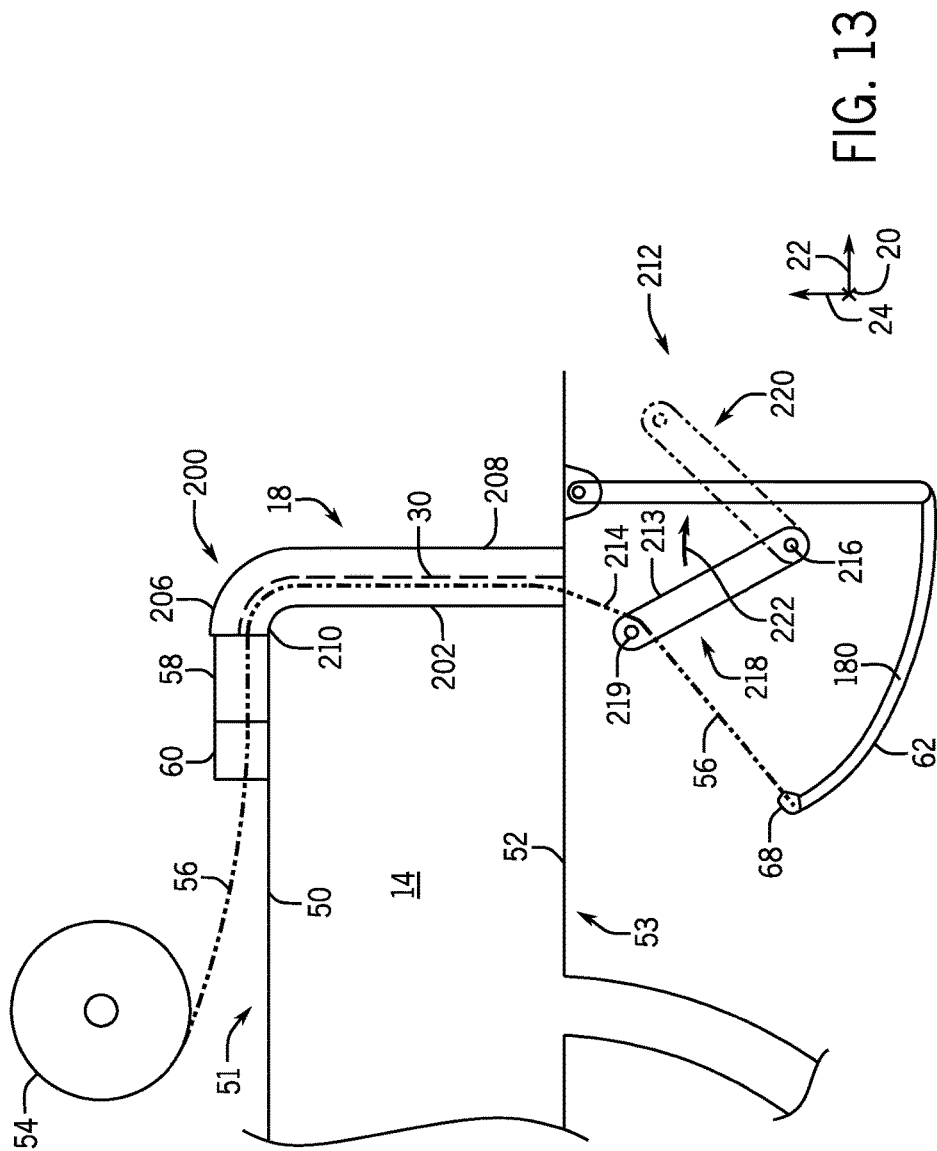
FIG. 13 is a side cross-sectional view of an embodiment of a baling chamber having a friction-based compression system.

As mentioned above, the track assembly 180 of the needle 62 may be utilized to direct or route the strap 56 around at least a portion of the baling chamber 14. The track assembly 180 of the needle 62 may be utilized in certain strapping systems, such as the systems illustrated in FIGS. 13-16. FIG. 13 is a side cross-sectional view of an embodiment of a baling chamber 14 having a friction-based compression system. As shown, the baling chamber 14 has the top wall 50 and the bottom wall 52. The forward plunger 26 may be provided to compress material within the baling chamber 14; however, the second end 18 of the baling chamber 14 may be open (e.g., the rear wall 40 may not be provided). Additionally, the baling chamber 14 may include a first side wall 196 and a second side wall 198, opposing the first side wall 196. The first and second side walls 196, 198 may each extend along the length of the chamber parallel to the longitudinal axis 20. The first and second side walls 196, 198 may be configured to frictionally maintain the material within the baling chamber 14, even as the forward plunger 26 moves within the baling chamber 14, thereby facilitating compression of the material.

As shown, the spool 54, the strap feeding assembly 58, and the sealing assembly 60 are provided on the first side of the baling chamber 14. The strap feeding assembly 58 may be coupled to the sealing assembly 60, in certain embodiments. As discussed above with respect to FIG. 1, the spool 54, the strap feeding assembly 58, and the sealing assembly 60 may be disposed at any suitable location within the baler 10, such as on the first side 53 of the baling chamber 14, for example. Additionally, a door 200 (e.g., a bar, beam, wall, structure, etc.) is provided, and the door 200 is configured to be removably inserted into the baling chamber 14. In the illustrated embodiment, the door 200 is configured to be inserted into the baling chamber 14 proximate to the second end 18 of the baling chamber 14 (e.g., between the material and the second end 18 of the baling chamber 14). As discussed in more detail below, the door 200 includes the slot 30 disposed on a material-facing surface 202, and the slot 30 is configured to direct the strap 56 from the first side 51 to the second side 53 of the baling chamber 14. In certain embodiments, the strap feeding assembly 58 and the sealing assembly 60 are movable, while one or both of the spool 54 and the door 200 are stationary or fixed with respect to the baling chamber 14.

In the illustrated embodiment, the strap feeding assembly 58 is configured to propel the strap 56 (e.g., through the slot 30 of the door 200), and the sealing assembly 60 is configured to seal one portion of the strap 56 to another portion of the strap 56 to form a loop around the bale. As mentioned above, the strapping feeding assembly 58 and/or the sealing assembly 60 may be movable relative to the baling chamber 14. In certain embodiments, the strap feeding assembly 58 and/or the sealing assembly 60 may move (e.g., slide, roll, etc.) along the top wall 50 of the baling chamber 14 parallel to the longitudinal axis 20 of the baler 10. Such movement enables the strap feeding assembly 58 to direct the strap 56 into the slot 30 of the door 200, as described in detail below. Additionally, such movement enables the sealing assembly 60 to move along with the bale and to seal the strap 56 into a loop around the bale as the bale travels rearwardly within the baling chamber 14, as described in detail below.

Additionally, the door 200 includes a slot 30, which may be similar to the slot 30 described above with respect to FIG. 1. The slot 30 of the door 200 may include the track assembly 130, 140 described above with respect to FIGS. 7 and 8. Furthermore, the track assembly 130, 140 may be segmented. As shown in FIG. 13, the door 200 extends through the baling chamber 14 from the first side 51 to the second side 53. The door 200 is configured to move in and out of (e.g., be inserted into and removed or withdrawn from) the baling chamber 14 parallel to the vertical axis 24 of the baler 10, as set forth below. The door 200 may have any of a variety of configurations to facilitate receiving the strap 56 from the strap feeding assembly 58 and/or directing the strap 56 from the first side 51 to the second side 53 of the baling chamber 14. For example, the door 200 may include a first portion 206 (e.g., a first generally horizontal portion) and a second portion 208 (e.g., a second generally vertical portion). When the door 200 extends through (e.g., is inserted into) the baling chamber 14, a bottom section 210 of the first portion 206 may align with and/or may contact the top wall 50 of the baling chamber 14. Thus, the door 200 may be aligned with the strap feeding assembly 58, and the strap feeding assembly 58 may direct and/or propel the strap 56 into the slot 30 of the first portion 206 of the door 200. The strap 56 is then propelled and/or routed through the slot 30 from the first portion 206 to the second portion 208 and toward the second side 53 of the baling chamber 14, as shown by arrow 211.

As shown, the baler 10 of FIG. 13 also includes a strap accumulator 212 disposed on the second side 53 of the baling chamber 14 proximate to the needle 62. The strap accumulator 212 may have any suitable form that enables the strap accumulator 212 to collect and/or to provide excess strap 56 for strapping the bale, as described in detail below. For example, the strap accumulator 212 may include a pivot arm 213 that is configured to capture a portion 214 of the strap 56 and to create slack in the strap 56, and/or to generate an additional length of strap 56 for use in the strapping process. For example, the needle 62 may utilize or drawn upon the excess strap 56 to surround the material with the strap 56. Alternatively, the slack in the strap 56 may enable the strap 56 to be pulled (e.g., drawn) rearwardly to surround the material at the second end 18 of the baling chamber 14 as the material accumulates in the baling chamber 14, as described in more detail below.

As shown, the pivot arm 213 captures the portion 214 of the strap 56. The pivot arm 213 may capture the portion 214 of the strap 56 through any suitable mechanism, such as a gripper 219 (e.g., a hook, a pin, an actuated gripper, etc.). In some embodiments, the gripper 219 may have a similar configuration to the gripping assembly 68, for example, and may generally be configured to grip (e.g., releasably grip or hold) the strap 56. Once the strap 56 is gripped by the gripper 219, the pivot arm 213 rotates about a hinge 216 from a first position 218 to a second position 220, as shown by arrow 222. In the first position 218, the pivot arm 213 is generally configured to receive and/or to capture the strap 56 as the strap 56 exits the slot 30 of the door 200 at the second side 53 of the baling chamber 14. After capturing the strap 56, the pivot arm 213 rotates to the second position 220, thereby pulling the strap 56 from the strap feeding assembly 58 and through the slot 30 to generate slack or excess strap 56 on the second side 53 of the baling chamber 14, which may be used to surround the material, as described in detail below.

In one embodiment, the strap 56 may be propelled through the slot 30 of the door 200, and the strap 56 may be received by the gripper 219 of the pivot arm 213. The strap 56 may additionally be propelled and directed toward the gripping assembly 68 of the needle 62. For example, the strap 56 may be directed from the slot 30 of the door 200 or from the gripper 215 of the pivot arm 213 toward the gripping assembly 68. In some embodiments, the strap 56 is directed toward the gripping assembly 68 of the needle 62 via the track assembly 180 disposed within or on the needle 62, as discussed above with respect to FIG. 11. The gripping assembly 68 may be configured to receive and to grip the strap 56, as described above.

Figure 14:
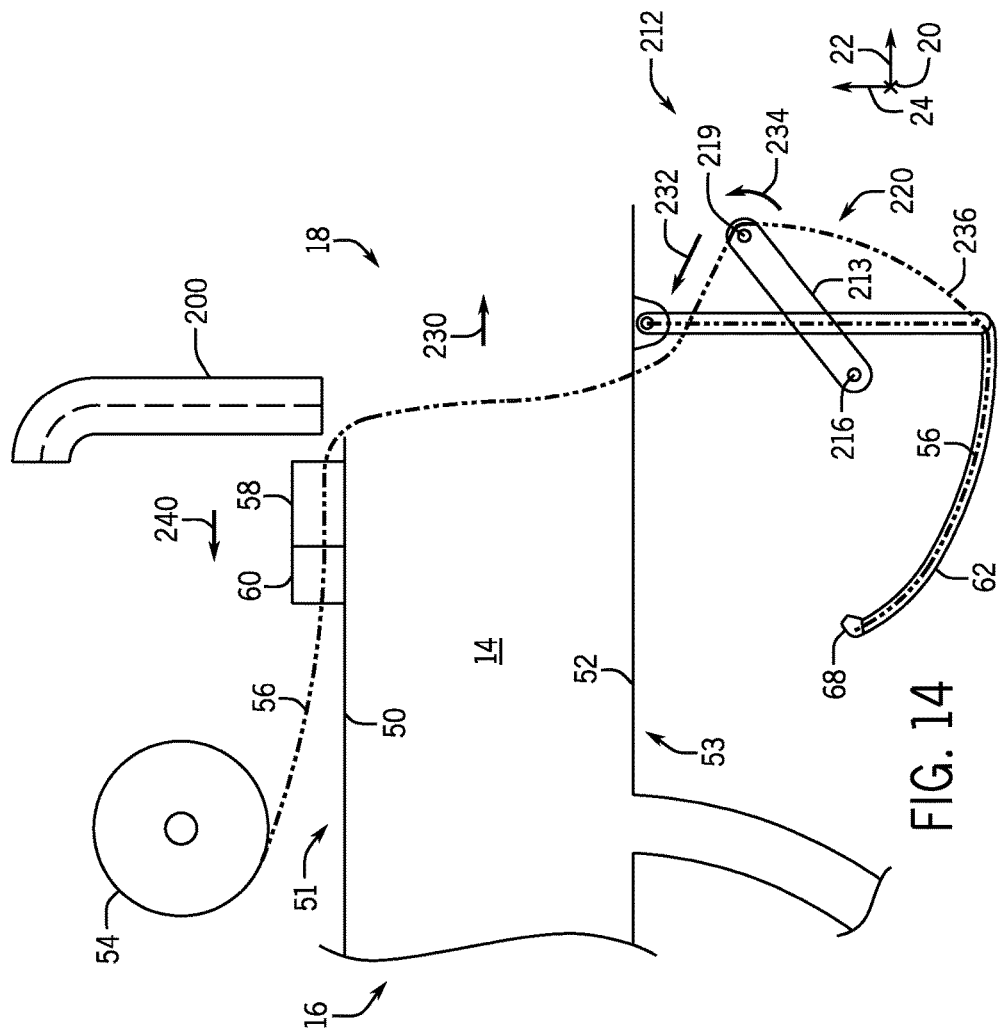
FIG. 14 is a side cross-sectional view of an embodiment of the baling chamber of FIG. 13, in which the rear wall is removed from the baling chamber.

FIG. 14 is a side cross-sectional view of an embodiment of the baling chamber 14 of FIG. 13, in which the door 200 is removed from the baling chamber 14. As shown in FIG. 14, after the strap 56 is received and gripped by the gripper 219 and/or by the gripping assembly 68, the door 200 may be removed from the baling chamber 14. The door 200 may be removed by moving the door 200 along the vertical axis 24 out of the baling chamber 14. The door 200 may be moved by any suitable mechanism. For example, the door 200 may be coupled to one or more actuators that are configured to move the door 200 out of the baling chamber 14.

As described above, the strap 56 is propelled through the slot 30 of the door 200 from the first side 51 to the second side 53 of the baling chamber 14. As the door 200 is withdrawn from the baling chamber 14, the strap 56 may be removed or drawn out of the slot 30 of the door 200, and the strap 56 may remain extended across the baling chamber 14 (e.g., may extend from the first side 51 to the second side 53 of the baling chamber 14). In certain embodiments, the track assembly 130, 140 may be disposed within the slot 30. In such embodiments, as the door 200 is withdrawn from the baling chamber 14, the gates 132, 146 may open to enable the strap 56 to be removed from the slot 30 so that the strap 56 may remain extended across the baling chamber 14 (e.g., may extend from the first side 51 to the second side 53 of the baling chamber 14, or from the strap feeding assembly 58 to the pivot arm 213). As described above, the gates 132, 146 may be configured to open and to release the strap 56 from the track assembly 130, 140 due to a tension or force applied by the strap 56, or the gates 132, 146 may be actuated, for example.

After the door 200 is withdrawn from the baling chamber 14, the material accumulates in the baling chamber 14 and moves rearwardly as shown by arrow 230. The material contacts the strap 56 and draws the strap 56 rearwardly as the material moves through the baling chamber 14. In certain embodiments, the excess strap 56 held by the pivot arm 213 is drawn into the baling chamber 14 to surround the material, as shown. For example, once the strap 56 is gripped by the gripper 219 and/or the door 200 is withdrawn from the baling chamber 14, the strap feeding assembly 58 may stop propulsion of the strap 56 and/or may block any additional length of the strap 56 from being drawn from the strap feeding assembly 58. In such configurations, the material may move rearwardly within the baling chamber 14, and the excess strap 56 located on the second side 53 of the baling chamber 14 may move into the baling chamber 14, as shown by arrow 232, to surround the material proximate to the second end 18 of the baling chamber 14. Additionally, the pivot arm 213 may rotate about the hinge 218, as shown by arrow 234, as the material accumulates in the baling chamber 14 and draws the strap 56 rearwardly. The pivot arm 213 may rotate in the direction 234 freely or may provide tension, which may increase the density of the bale, for example. The gripper 219 of the pivot arm 213 may grip the strap 56 as the pivot arm 213 rotates in the direction 234, thus maintaining at least a portion 236 of the excess strap 56 for moving the strap 56 around the material proximate to the first end 16 of the baling chamber 14.

In other embodiments, the gripper 219 of the pivot arm 213 may hold the strap 56, and the pivot arm 213 may remain fixed in the second position 220 as the material accumulates in the baling chamber 14. Thus, as the material accumulates and moves rearwardly in the baling chamber 14, the material pulls or draws the strap 56 from the strap feeding assembly 58 to surround the material proximate to the second end 18 of the baling chamber 14.

Additionally, as the material accumulates in the baling chamber 14 and draws the strap 56 in a first direction 230 (e.g., rearwardly), the strap feeding assembly 58 and/or the sealing assembly 60 may move in a second direction 240 (e.g., forwardly), opposite the first direction 230, along the top wall 50 of the baling chamber 14. For example, the strap feeding assembly 58 and/or the sealing assembly 60 may move forwardly to enable the strap 56 to be directed into the sealing assembly 60 as the strap 56 moves from the second side 53 to the first side 51 of the baling chamber 14, as described in more detail below. In some embodiments, the strap feeding assembly 58 and/or sealing assembly 60 may move between about 0.5 meters (m) to 3 m, 1 m to 2 m, or about 1.5 m along the top wall 50 of the baling chamber 14.

Figure 15:
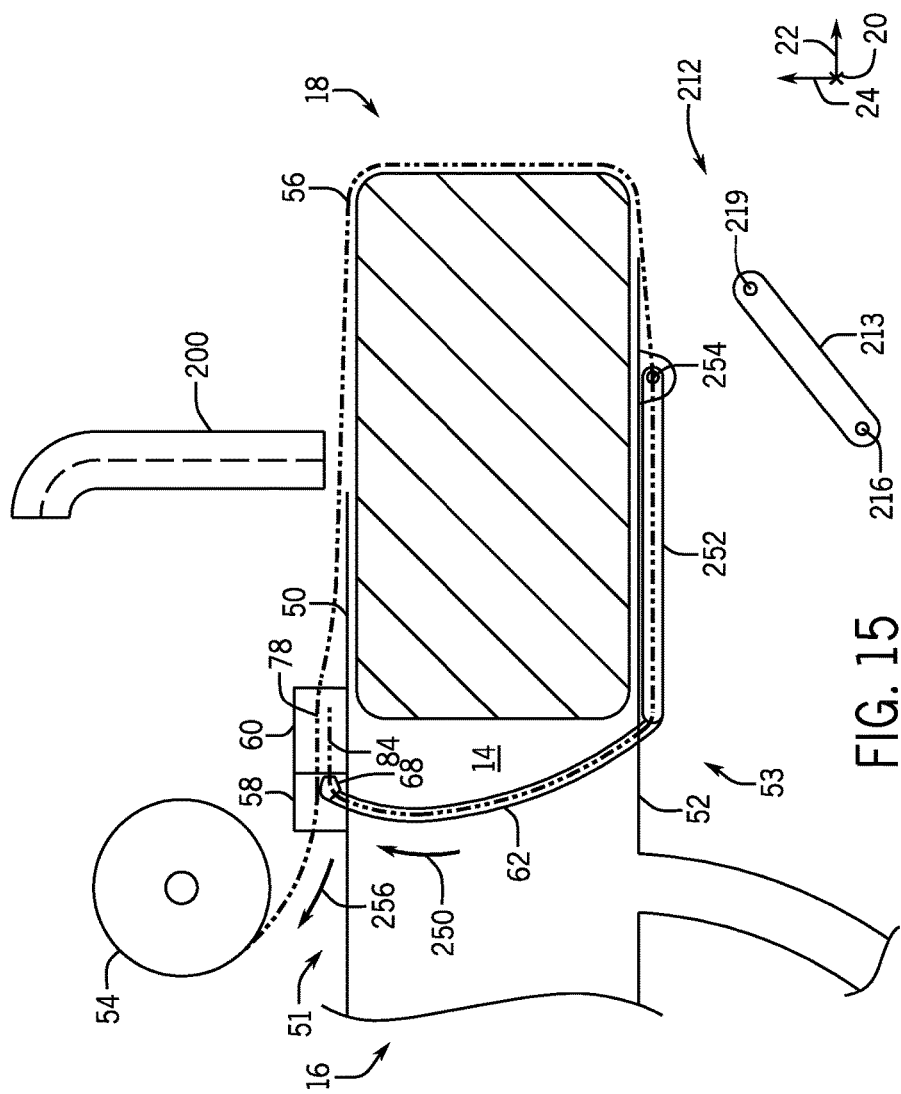
FIG. 15 is a side cross-sectional view of an embodiment of the baling chamber of FIG. 13, in which the needle extends through the baling chamber.

FIG. 15 is a side cross-sectional view of an embodiment of the baling chamber 14 of FIG. 13, in which the needle 62 extends through (e.g., across) the baling chamber 14 to surround the bale with the strap 56. Once the bale within the baling chamber 14 reaches a desired size and/or density, the strapping process may be completed. As shown, the gripping assembly 68 of the needle 62 grips the strap 56, and the needle 62 moves (e.g., rotates and/or translates) through the baling chamber 14 as indicated by arrow 250. The needle 62 may be coupled to an arm 252 which rotates about a hinge 254 to move the needle 62 through the baling chamber 14, as shown. Thus, the needle 62 brings the strap 56 from the second side 53 of the baling chamber 14 to the first side 51 of the baling chamber 14. In certain embodiments, the needle 62 may move between the second side 53 and first side 51, or vice versa, through the slots 30 of the forward plunger 26. Such a configuration provides a path for the needle 62 to move through the baling chamber 14 and enables the forward plunger 26 to maintain contact with (e.g., engage) the bale, thereby maintaining the shape of the bale while the needle 62 moves the strap 56 around the bale.

Additionally, the needle 62 may be configured to pull or to draw the strap 56 from the strap feeding assembly 58, in certain embodiments. Thus, the strap feeding assembly 58 may release tension on the strap 58, enabling the needle 62 to draw the strap 56 across the baling chamber to surround the bale. As discussed above, in other embodiments, the needle 62 may be configured to pull or draw the excess strap 56 generated by the strap accumulator (e.g., the pivot arm 213).

As mentioned above, in some embodiments, the strap 56 may be positioned within the track assembly 180 of the needle 62. In such embodiments, as the needle 62 moves through the baling chamber 14, the strap 56 is contained within the track assembly 180. The needle 62 may insert the end 84 of the strap 56 into the sealing assembly 60, and the strap feeding assembly 58 may retract the strap 56 and tighten the strap 56 around the bale. When the strap 56 is tightened around the bale, the strap 56 may be removed from (e.g., pulled out of) the track assembly 180 of the needle 62 to engage the bale. Additionally, in such embodiments, the needle 62 is configured to contain the strap 56 as the needle 62 moves through the baling chamber 14, and thus the needle 62 may move through the slot 30 of the forward plunger 26, which does not include a track assembly 130, 140.

In the illustrated embodiment, the needle 62 directs or transfers the end 84 of the strap 56 into the sealing assembly 60. In some embodiments, the end 84 of the strap 56 may extend approximately 30 cm or less from the gripping assembly 68. When the end 84 of the strap 56 is transferred to the sealing assembly 60, the gripping assembly 68 of the needle 62 releases the strap 56. The sealing assembly 60 holds the received end 84 of the strap 56 and brings the end 84 into contact with the portion 78 of the strap 56 already disposed within the sealing assembly 60. In certain embodiments, the strap feeding assembly 58 may retract (e.g., pull back) on the strap 42 as indicated by arrow 256, thus tightening the strap 56 around the bale prior to the strap 56 being sealed. The sealing assembly 60 may seal the end 84 to the portion 78 of the strap 56, thus sealing the strap 56 into a loop around the bale within the baling chamber 14.

Figure 16:
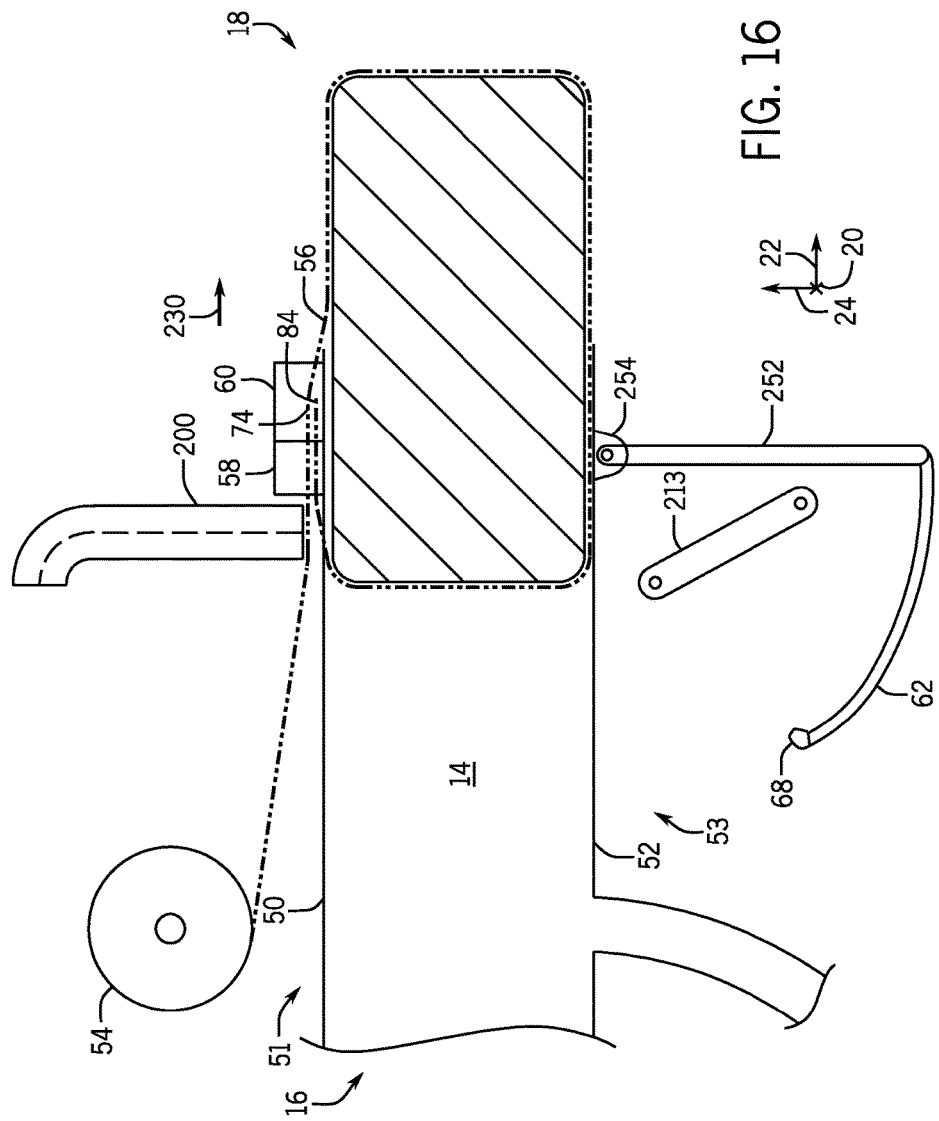
FIG. 16 is a side cross-sectional view of an embodiment of the baling chamber of FIG. 13, in which the strap is sealed around the bale.

FIG. 16 is a side cross-sectional view of an embodiment of the baling chamber 14 of FIG. 13, in which the strap 56 is sealed around the bale. As shown, the strap feeding assembly 58 and/or the sealing assembly 60 moves rearwardly as shown by arrow 230 along with the bale as the bale moves rearwardly within the baling chamber 14. Thus, the end 84 of the strap 56 may be sealed to the portion 78 of the strap 56 within the sealing assembly 60 as the bale moves through the baling chamber 14. In certain embodiments, the strap feeding assembly 58 and/or the sealing assembly 60 may move rearwardly past the door 200. Moving the sealing assembly 60 may enable the end 84 to be sealed securely to the portion 78 of the strap 56 without interrupting the flow of material into the chamber or the strapping process. For example, sealing the end 84 to the portion 78 may take between 1 and 20 seconds, 5 and 15 seconds, or longer. Thus, the movable sealing assembly 60 obviates a delay that may otherwise be associated with the seal process, thereby increasing the efficiency of the baler. Additionally, as shown, the needle 62 may move (e.g., retract, rotate, etc.) through the baling chamber 14 from the first side 51 to the second side 53 in preparation for strapping a subsequent bale.

Figure 17:
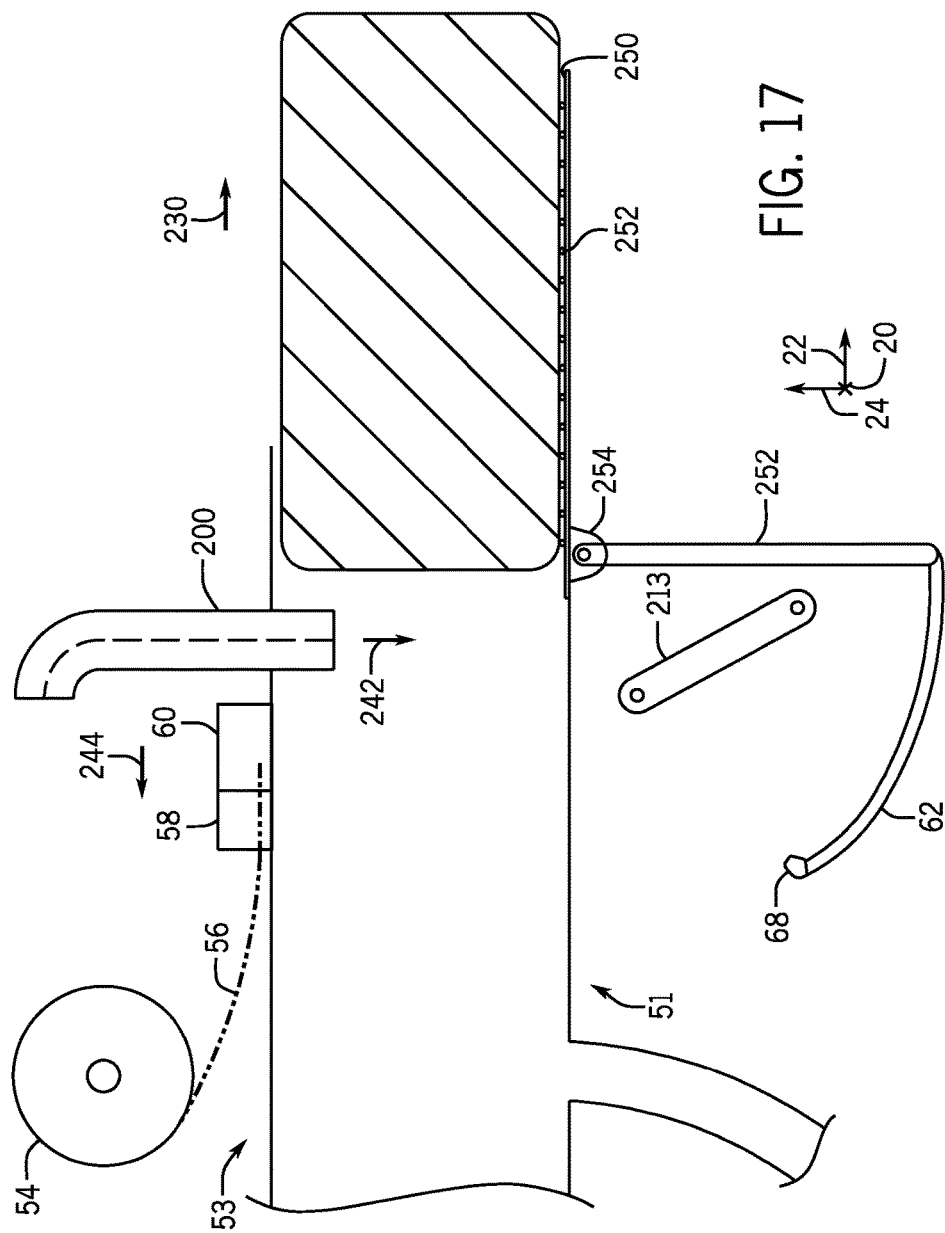
FIG. 17 is a side cross-sectional view of an embodiment of the baling chamber of FIG. 13, in which the strapped bale is removed from the chamber to provide a space for the rear wall to be inserted into the baling chamber to receive the strap for a subsequent bale.

FIG. 17 is a side cross-sectional view of an embodiment of the baling chamber 14 of FIG. 13, in which the door 200 is inserted into the baling chamber 14 to receive the strap 56 for a subsequent bale. As shown, a first bale 240 is sealed and moves rearwardly out of the baling chamber 14. Furthermore, additional material flows into the baling chamber 14, and the door 200 is inserted, as shown by arrow 242, between the material flow and the first bale 240 to enable the strap 56 to be transferred through the baling chamber 14 from the first side 51 to the second side 53 for strapping the subsequent bale. After the door 200 is inserted into the baling chamber 14, the strap 56 may be fed from the strap feeding assembly 58 through the slot 30 of the door 200 from the first side 51 to the second side 53 of the baling chamber 14, as described above. Additionally, as shown, after the strap 56 is sealed around the first bale 240, the strap feeding assembly 58 and/or the sealing assembly 60 may move forwardly as shown by arrow 244 to enable the strap feeding assembly 58 to align with and to direct the strap 56 into the slot 30 of the door 200 when the door 200 is inserted into the baling chamber 14.

Additionally, any suitable mechanism may be utilized to remove the bale from the baling chamber 14. For example, as shown, the bottom wall 52 includes a conveyor 250 (e.g., a belt, track, chain etc.) to facilitate removal of the bale from the baling chamber 14. The conveyor 250 may have a textured surface 252 (e.g., protrusions, dogs, etc.) configured to engage the bale and to facilitate removal of the bale from the baling chamber 14. Thus, after the strap 56 is placed around the bale, the conveyor 250 may urge the bale toward the second end 18 of the baling chamber 14, thereby pulling the bale out of the baling chamber 14 rearwardly, as shown by arrow 230.

Figure 18:
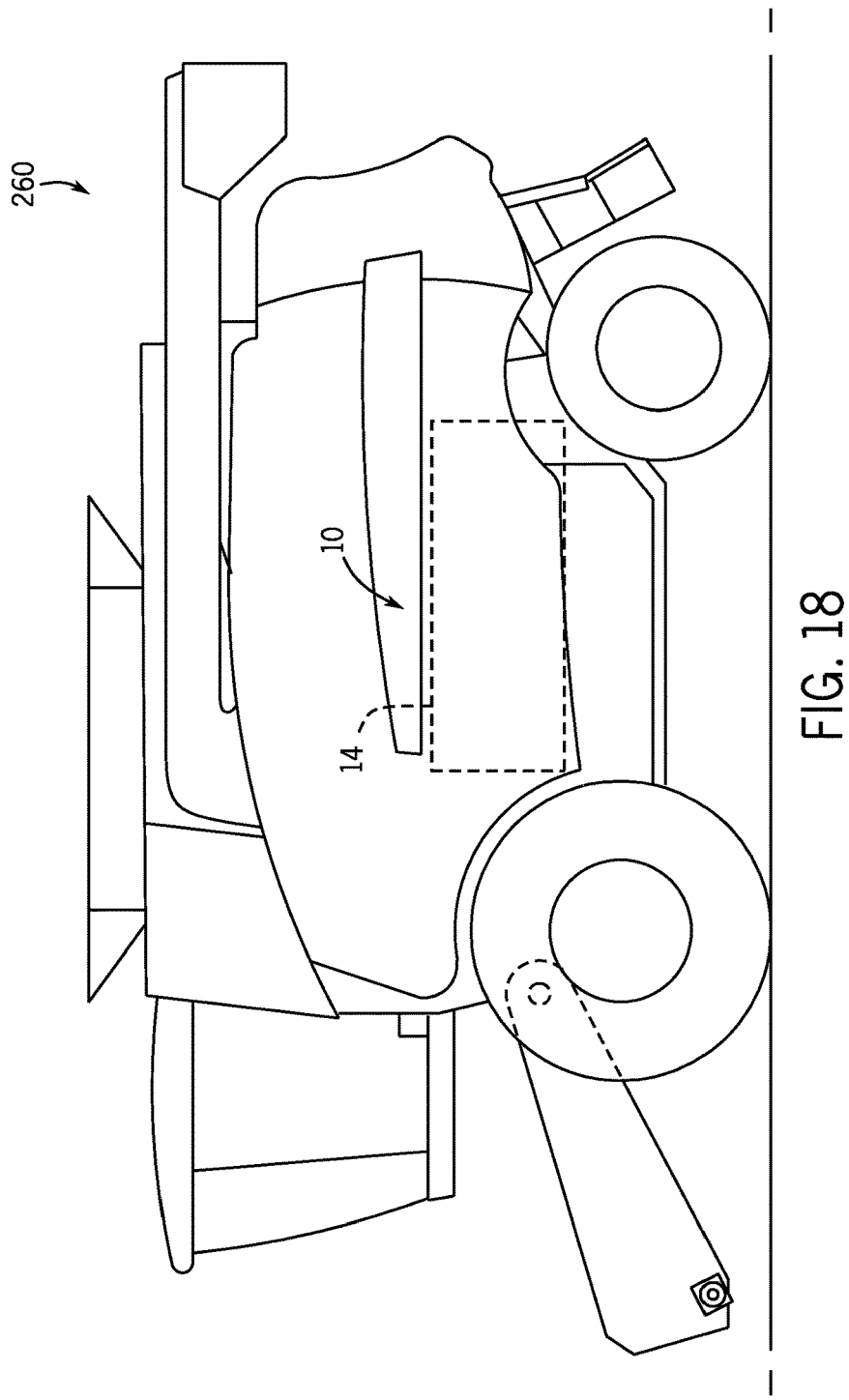
FIG. 18 is a side view of an embodiment of a self-contained vehicle including a baler.

FIG. 18 is a side view of an embodiment of a self-contained vehicle 260 including the baler 10. As illustrated, the baling chamber 14 is supported and/or mounted within or on the self-contained vehicle 260. The material may flow into the baling chamber 14 via a conveyance system, where the material is baled in a manner described above. Thus, the baler 10 may be configured to collect and bale material as the self-contained vehicle 260 travels through the field.

Figure 19:
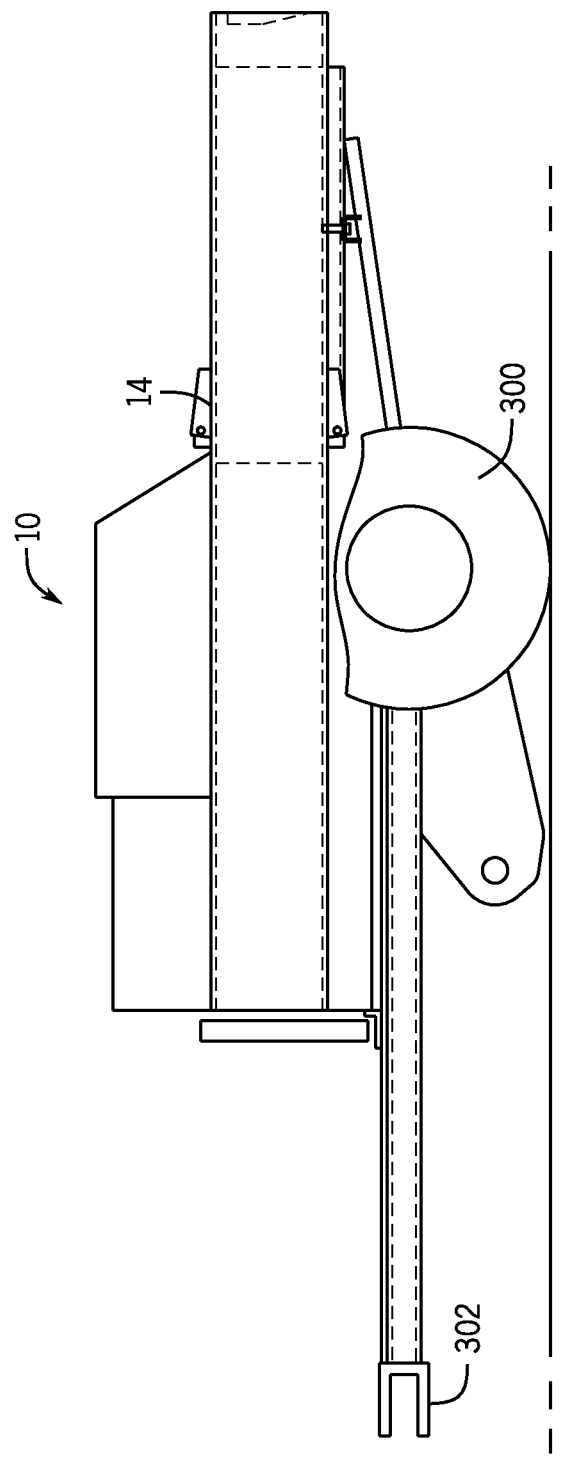
FIG. 19 is a side view of an embodiment of a towable implement having a baler, in which the towable implement is configured to be towed by a tow vehicle.

FIG. 19 is a side view of an embodiment of a towable implement having the baler 10, in which the towable implement is configured to be towed by a tow vehicle. As shown, towable implement includes the baler 10 having a baling chamber 14. The towable implement may be ground-supported by wheels 300 and may be coupled to a tow vehicle (e.g., a harvester, a tractor, etc.) by a projection 302 that is configured to connect the implement to the tow vehicle. Thus, the implement may be pulled through a field. In such a configuration, the baler 10 collects and bales material as the implement travels through the field behind the tow vehicle.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A strapping system for an agricultural implement comprising:
   a strap feeding assembly positioned on a first side of a baling chamber;
   a needle positioned on a second side of the baling chamber, opposite the first side; and
   a first slot disposed within a first material-facing surface of a rear wall of the baling chamber;
   wherein the strap feeding assembly is configured to propel a strap through at least a portion of the first slot to the second side of the baling chamber, and wherein the needle is configured to grip a portion of the strap and to move the portion of the strap from the second side of the baling chamber to the first side of the baling chamber to surround a material within the baling chamber with the strap.

2. The strapping system of claim 1, wherein a track assembly is disposed within the first slot.

3. The strapping system of claim 2, wherein the track assembly comprises a gated channel.

4. The strapping system of claim 1, comprising a second slot disposed within a second material-facing surface of a first plunger.

5. The strapping system of claim 4, wherein the needle is configured to move through the second slot to move the portion of the strap from the second side to the first side of the baling chamber.

6. The strapping system of claim 1, comprising a second plunger having the rear wall, wherein the second plunger is configured to control a density of the material in the baling chamber.

7. The strapping system of claim 1, comprising a sealing assembly positioned on the first side of the baling chamber, wherein the sealing assembly is configured to receive the portion of the strap from the needle and to seal the portion of the strap to another portion of the strap to seal the strap into a loop around the material.

8. The strapping system of claim 1, wherein the strap feeding assembly is configured to propel the strap through the first slot as the material accumulates in the baling chamber.

9. The strapping system of claim 1, comprising a rear door having the rear wall, wherein the rear door is configured to move between a first position that facilitates bale formation within the baling chamber and a second position that enables the bale to exit the baling chamber.

10. A strapping system for an agricultural implement comprising:
    a strap feeding assembly configured to propel a strap around at least a portion of a baling chamber;
    a needle configured to receive a portion of the strap, to grip the portion of the strap, and to move the portion of the strap through a slot disposed on a material-facing surface of a plunger from a first side of the baling chamber to a second side of the baling chamber; and
    a track assembly extending along the portion of the baling chamber, along the needle, or a combination thereof, wherein the track assembly is configured to retain the strap at least until the needle moves the portion of the strap to the second side of the baling chamber;
    wherein the needle comprises a gripping assembly configured to grip the portion of the strap and the gripping assembly comprises a sensor configured to detect the strap within the gripping assembly, and the gripping assembly is configured to grip the portion of the strap upon detection of the portion of the strap within the gripping assembly.

11. The strapping system of claim 10, wherein the gripping assembly is actuated by a cable disposed within a cavity of the needle.

12. The strapping system of claim 10, comprising a rear door opposite the plunger, wherein the rear door is configured to control a density of the material in the baling chamber.

13. The strapping system of claim 10, comprising a rear door opposite the plunger, wherein the rear door is configured to pivot about a hinge to facilitate removal of a bale from the baling chamber.

14. A method for strapping a material in an agricultural implement using a strapping system, comprising:
    moving a rear door having a slot to a first position that facilitates bale formation within a baling chamber;
    routing a strap through the slot and around at least a portion of the baling chamber;
    directing a portion of the strap into a gripping assembly of a needle; gripping the portion of the strap with the gripping assembly; and
    moving the portion of the strap through the baling chamber via movement of the needle to surround the material with the strap;
    wherein the gripping assembly is actuated by a cable disposed within a cavity of the needle.

15. The method of claim 14, comprising moving the rear door from the first position to a second position that enables the bale to exit the baling chamber.

16. The method of claim 14, wherein moving the portion of the strap through the baling chamber comprises directing the portion of the strap into a sealing assembly.

17. The method of claim 16, comprising sealing the portion of the strap to another portion of the strap to seal the strap into a loop around the material in the baling chamber.

* * * * *